US010700765B1

(12) United States Patent
Syed

(10) Patent No.: US 10,700,765 B1
(45) Date of Patent: Jun. 30, 2020

(54) ELECTRONIC DEVICES AND METHODS OF DATA TRANSMISSION

(71) Applicant: Corsair Memory, Inc., Fremont, CA (US)

(72) Inventor: Taniyyus Syed, Fremont, CA (US)

(73) Assignee: Corsair Memory, Inc, Fremont, CA (US)

( * ) Notice: Subject to any disclaimer, the term of this patent is extended or adjusted under 35 U.S.C. 154(b) by 0 days.

(21) Appl. No.: 16/240,739

(22) Filed: Jan. 5, 2019

(51) Int. Cl.
*H04B 7/155* (2006.01)
*H04L 29/06* (2006.01)
*H04B 7/212* (2006.01)

(52) U.S. Cl.
CPC ......... *H04B 7/15521* (2013.01); *H04B 7/212* (2013.01); *H04L 63/0853* (2013.01)

(58) Field of Classification Search
CPC .. H04B 7/15521; H04B 7/212; H04L 63/0853
See application file for complete search history.

(56) References Cited

U.S. PATENT DOCUMENTS

2019/0125454 A1* 5/2019 Stokes ................... A61B 34/10

* cited by examiner

*Primary Examiner* — Jianye Wu
(74) *Attorney, Agent, or Firm* — Carina M. Tan

(57) ABSTRACT

According to certain embodiments, a smart dongle is used for enabling wireless communication between a user's computer and a plurality of user's wireless computer peripheral devices, the smart dongle is configured to: (i) create a data frame for digital transmission based on an audio-type frame format of sample rate in a range of 44 kHz to 96 kHz; (ii) create a respective time slot in the data frame for each of a wireless mouse, a wireless keyboard and a wireless audio headset of the plurality of user's wireless peripheral devices that are paired to the smart dongle; (iii) transmit data from the wireless keyboard to the user's computer at a first latency that is less than a first time period in a range of 2 milliseconds to 3 milliseconds; (iv) transmit data from the wireless mouse to the user's computer at a second latency that is less than a second time period in a range of 2 milliseconds to 3 milliseconds; and (v) transmit data from the wireless audio headset to the user's computer at a third latency that is less than a third time period in a range of 10 milliseconds to 14 milliseconds.

8 Claims, 10 Drawing Sheets

FRAME - 1  800

FRAME - 2  850

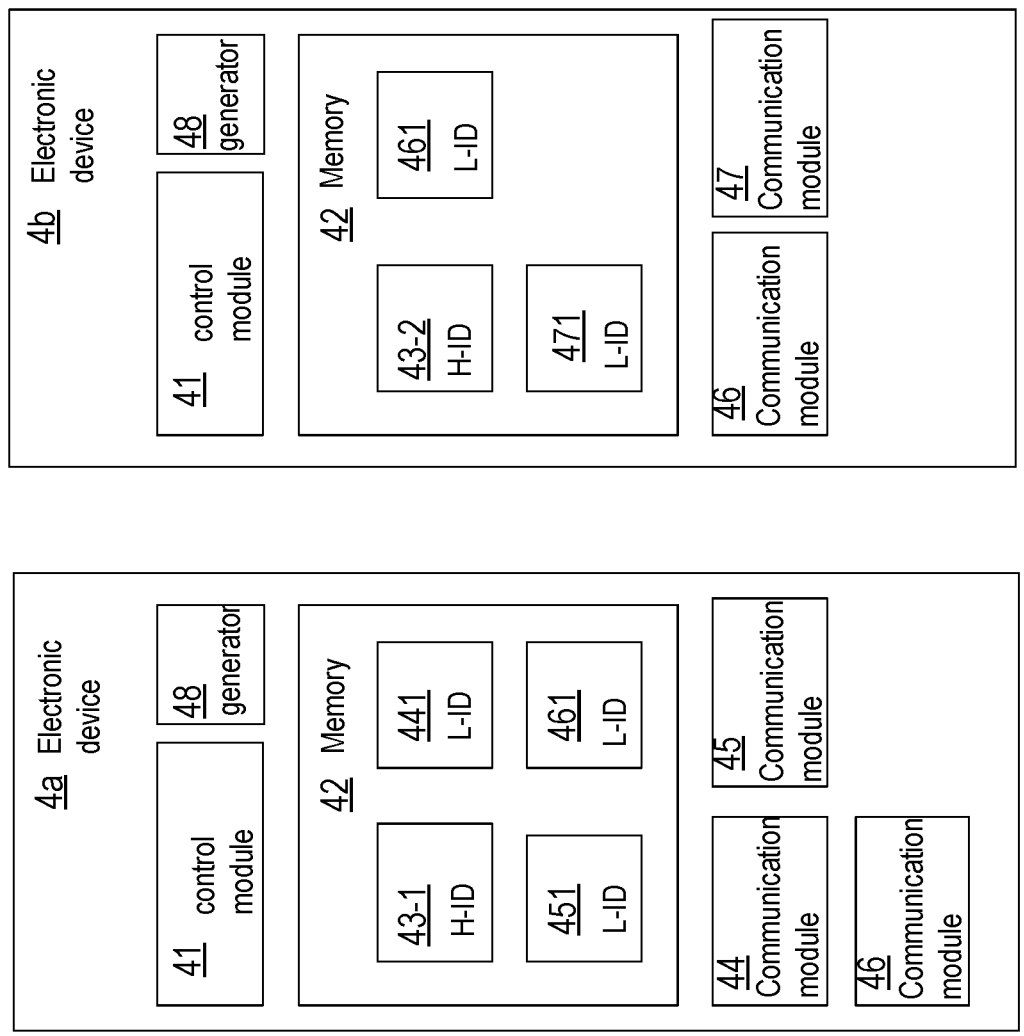

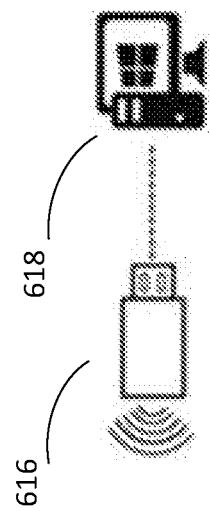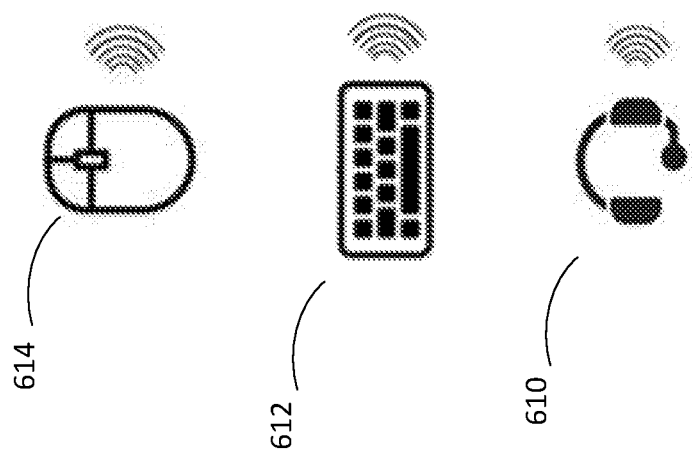
FIG. 6

ELECTRONIC DEVICES AND METHODS OF DATA TRANSMISSION

TECHNICAL FIELD

The subject application relates to electronic devices and methods of data transmission.

BACKGROUND

Response time of a computer or a periphery device (e.g., a human interface device) is critical. For example, in an eco-system, which includes a host (e.g., a computer, a server, a laptop or the like) and some peripheral devices (e.g., an audio headset, a keyboard, a mouse, etc.), lag or failure of signal interactions between the host and the periphery devices may adversely affect performance of the eco-system. Such lag may be resulted from, for example but is not limited to, traffic congestion, deterioration of communication quality, etc.

For example, the eco-system may include a gaming system, where lag or failure of signal interactions between the host and the periphery devices may cause uncomfortable experience of user(s) or gamer(s). The lag or failure of signal interactions may also adversely affect results of competition.

Lag or failure may occur during communication channel or pipe switch, e.g., from one wireless channel (between a host and an human interface device) to another wireless channel in order to have a better communication quality. Lag or failure may occur during channel switch e.g., from one wired channel to another wired channel to have a better communication quality. Lag or failure may occur during channel switch e.g., from a wireless channel to a wired channel (e.g., for battery charge or to avoid mutual interferences). Lag or failure may occur during channel switch e.g., from a wired channel to a wireless channel for relatively comfortable or convenient manipulation (or control).

A device (either the host or the periphery device) of the eco-system may lose parameter(s) or configuration during channel switch, and one solution to fix this issue is to reset of the periphery device for reconfiguration, which is a time-consuming work.

BRIEF DESCRIPTION OF THE DRAWINGS

The accompanying drawings are included to provide a further understanding of the technology used in the present invention, and are incorporated into and constitute a part of this specification. The drawings illustrate embodiments and, together with the specification, serve to explain the principles of the technology used in the present invention.

FIG. 2A illustrates an electronic device, according to some embodiments of the subject application.

FIG. 2B illustrates another electronic device, according to some embodiments of the subject application.

FIG. 3 illustrates data according to some embodiments of the subject application.

FIG. 6 illustrates a smart dongle supporting wireless communication with a host computer, according to some embodiments of the subject application.

Figure 1A:
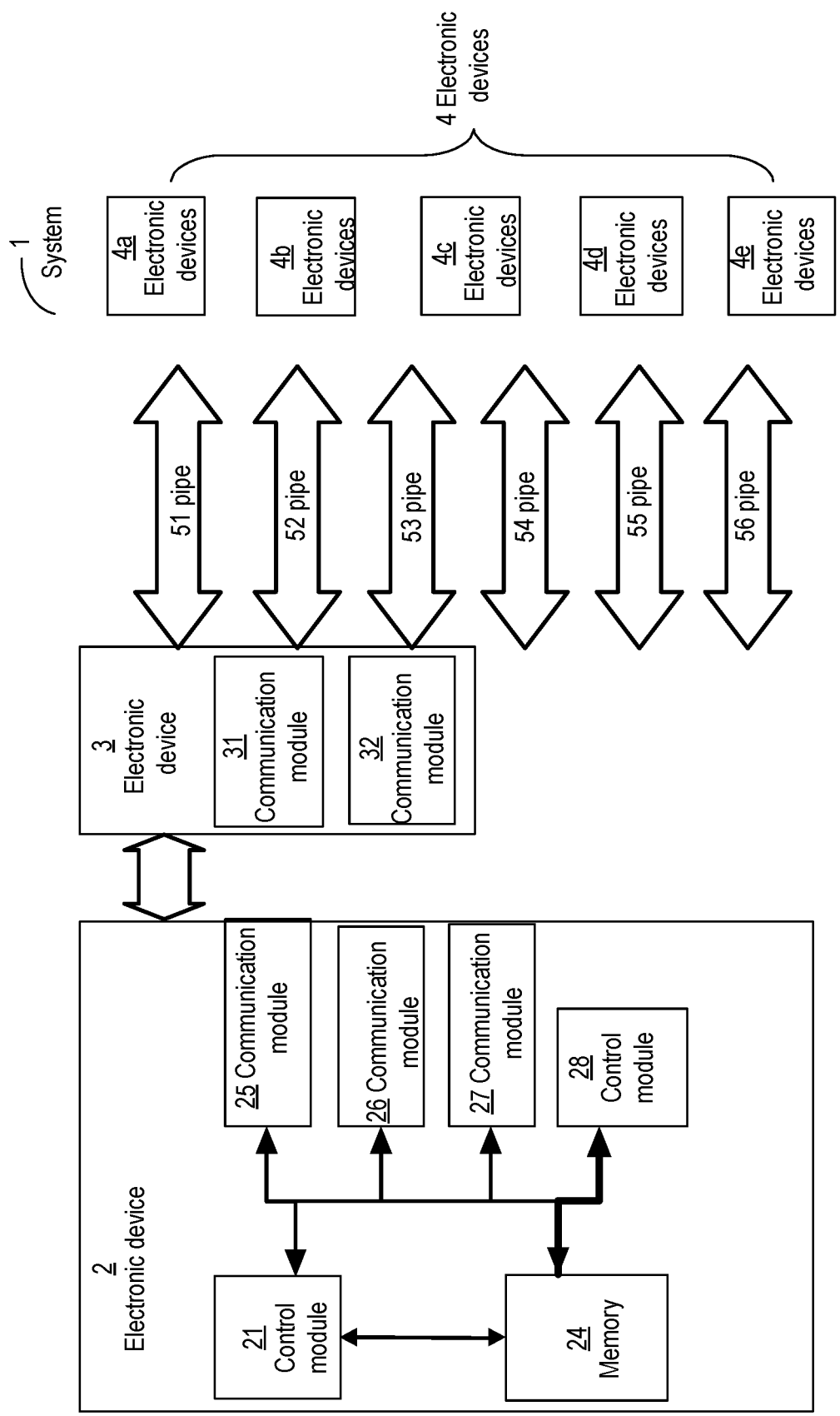
FIG. 1A illustrates a system according to some embodiments of the subject application.

For a better understanding of the aforementioned aspects of the invention as well as additional aspects and embodiments thereof, reference should be made to the Description of Embodiments below, in conjunction with the following drawings in which like reference numerals refer to corresponding parts throughout the figures.

DETAILED DESCRIPTION OF THE EMBODIMENTS

Methods, systems, user interfaces, and other aspects of the invention are described. Reference will be made to certain embodiments of the invention, examples of which are illustrated in the accompanying drawings. While the invention will be described in conjunction with the embodiments, it will be understood that it is not intended to limit the invention to these particular embodiments alone. On the contrary, the invention is intended to cover alternatives, modifications and equivalents that are within the spirit and scope of the invention. The specification and drawings are, accordingly, to be regarded in an illustrative rather than a restrictive sense.

Moreover, in the following description, numerous specific details are set forth to provide a thorough understanding of the present invention. However, it will be apparent to one of ordinary skill in the art that the invention may be practiced without these particular details. In other instances, methods, procedures, components, and networks that are well known to those of ordinary skill in the art are not described in detail to avoid obscuring aspects of the present invention.

Some embodiments of the subject application will be described in detail below referring to the accompanying drawings. Some embodiments of the subject application provide an electronic device. According to certain embodiments, the electronic device includes a memory and a control module. According to certain embodiments, the control module is configured to: generate data having a first portion and a second portion; transmit the first portion of the data on a first communication channel toward an external device; suspend transmission of the data on the first communication channel if an interruption occurs in interactions between the electronic device and the external device on the first communication channel; store the second portion of the data in the memory; and transmit the second portion of the data on a second communication channel toward the external device.

Some embodiments of the subject application provide an electronic device. The electronic device includes a memory and a control module. The control module is configured to: generate data having a first portion and a second portion; receive a first portion of data on a first communication channel from an external device; suspend the receipt of the data on the first communication channel if an interruption occurs in interactions between the electronic device and the external device on the first communication channel; store the first portion of the data in the memory; and receive a second portion of the data on a second communication channel from the external device.

Some embodiments of the subject application provide a method of data transmission. The method includes: generating data having a first portion and a second portion; transmitting the first portion of the data on a first communication channel between a first device and a second device; suspending transmission of the data on the first communication channel if an interruption occurs in interactions between the first device and the second device on the first communication channel; buffering the second portion of the data; and transmitting the second portion of the data on a second communication channel between the first device and the second device.

FIG. 1A illustrates a system 1 according to some embodiments of the subject application.

Referring to FIG. 1A, a system 1 or eco-system 1 may include, for example but is not limited to, a gaming system. Some embodiments include a surveillance system for security control, a rescue system where a robot, a drone (e.g., an unmanned aerial vehicle) is included, an automatic manufacture system (e.g., an unmanned factory), a remote control surgical system, etc.

The system 1 includes electronic devices 2, 3, and 4. The electronic device 2 may include a host computer such as a server, a laptop, a tablet, etc.

The electronic device 3 may include a dongle or a transceiver, according to some embodiments. According to some other embodiments, a transceiver may be built into electronic device 2.

The electronic devices 4 may include human interface device(s) or peripheral device(s). Examples of peripheral devices are headphones (or audio headsets), keyboards, mice, etc.

A communication channel or pipe 51 may be formed or created between the electronic device 2 and the electronic device 4. A communication channel or pipe 52 may be formed or created between the electronic device 2 and the electronic device 4. A communication channel or pipe 53 may be formed or created between the electronic device 2 and the electronic device 4. A communication channel or pipe 54 may be formed or created between the electronic device 2 and the electronic device 4. A communication channel or pipe 55 may be formed or created between the electronic device 2 and the electronic device 4. A communication channel or pipe 56 may be formed or created between the electronic device 2 and the electronic device 4. It is contemplated the eco-system 1 may include more or less communication pipe(s) between the electronic device 2 and the electronic device 4. The electronic device 3 may help or facilitate establishment of communication pipe(s) between the electronic device 2 and the electronic device 4.

The electronic device 2 includes a control module 21, a memory 24, communication modules 25, 26, and 27, and another control module 28. It is contemplated that the electronic device 2 may include more or less module(s) or component(s), which is not illustrated in FIG. 1A for simplicity.

The control module 21 may include, for example but is not limited to, a central processing unit (CPU), a control unit, a processor, an arithmetic and logic unit (ALU), or the like.

Memory 24 may include, for example but is not limited to, a volatile memory (e.g., a random access memory (RAM), Dynamic Random Access Memory (DRAM), Static Random Access Memory (SRAM)), a flash memory, a solid-state disk (or solid-state drive) (SSD), or other types of memory or memory module(s).

Each of the communication modules 25, 26, and 27 may include a wired communication module or a wireless communication module.

The control module 28 may include, for example but is not limited to, a power control (or management) module, a light control module, and a thermal control module or the like. It is contemplated that the electronic device 2 may more module(s). The power management module may control a power supply of the electronic device 2 (not shown in FIG. 1A). The light control module may control light emitting component(s) of the electronic device 2 (not shown in FIG. 1A). The thermal control module may control fan(s) of the electronic device 2 (not shown in FIG. 1A).

The electronic device 3 is electrically connected or coupled to the electronic device 2. The electronic device 3 includes communication modules 31 and 32. Each of the communication modules 31 and 32 may include wireless communication module or a wired communication module, respectively. It is contemplated that the electronic device 3 may include more or less module(s).

The electronic device(s) 4 (e.g., 4a, 4b, 4c, 4d, 4e) may include, for example but is not limited to, a point device (such as a mouse, a touch pad, or a stylus), a gad pad, a joy stick, an audio headset, a keyboard, a simulator (such as a driving simulator, a flight simulator, and a surgeon simulator), a camera (e.g., a webcam, a gesture capture camera, and a surveillance camera), a display (or a touch display), a surgeon console (e.g., an human interface device for the Da Vinci Surgical System), a remote control for a robot (e.g., a rescue robot and a scouting robot), a drone (e.g., an automatic pilot and an unmanned aerial vehicle), or robotic arms (not shown in FIG. 1A). The embodiments may include more or less than the number of device(s) 4 shown in FIG. 1A.

Each of the communication channels or pipes 51, 52, 53, 54, 55, and 56 may be established in accordance with a communication protocol, for example but is not limited to a Bluetooth communication protocol, a Wi-Fi communication protocol, ZigBee protocol, a proprietary communication protocol, USB communication protocol, Thunderbolt communication protocol, Ethernet communication protocol, or other protocol(s). In other words, as non-limiting examples, communication channel 51 may be a Bluetooth communication protocol, while communication channel 52 may be a Wi-Fi communication protocol, communication channel 53 may be a USB communication protocol, communication channel 54 may be a Thunderbolt communication protocol, etc.

Figure 1C:
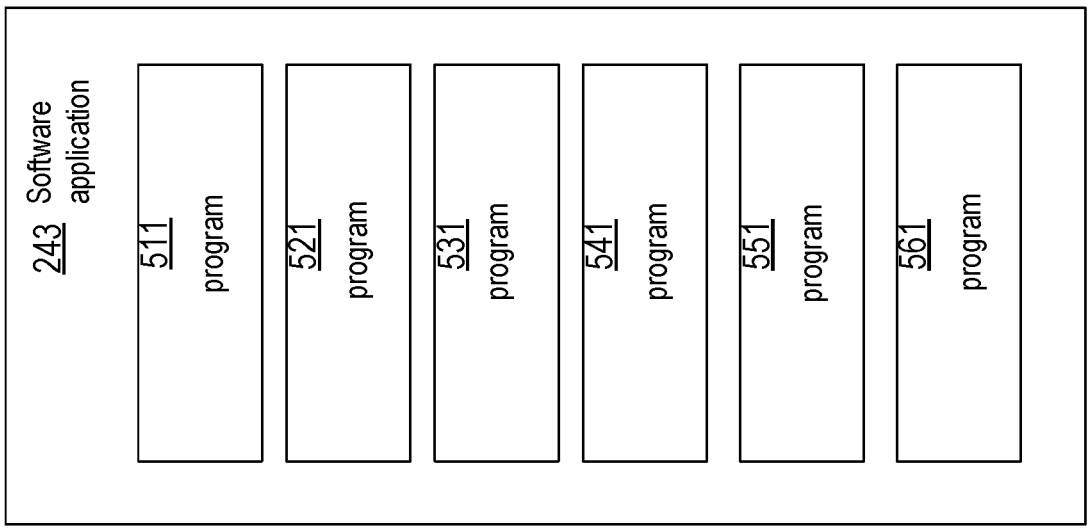
FIG. 1C illustrates software stored in the memory as shown in FIG. 1B according to some embodiments of the subject application.
Figure 1B:
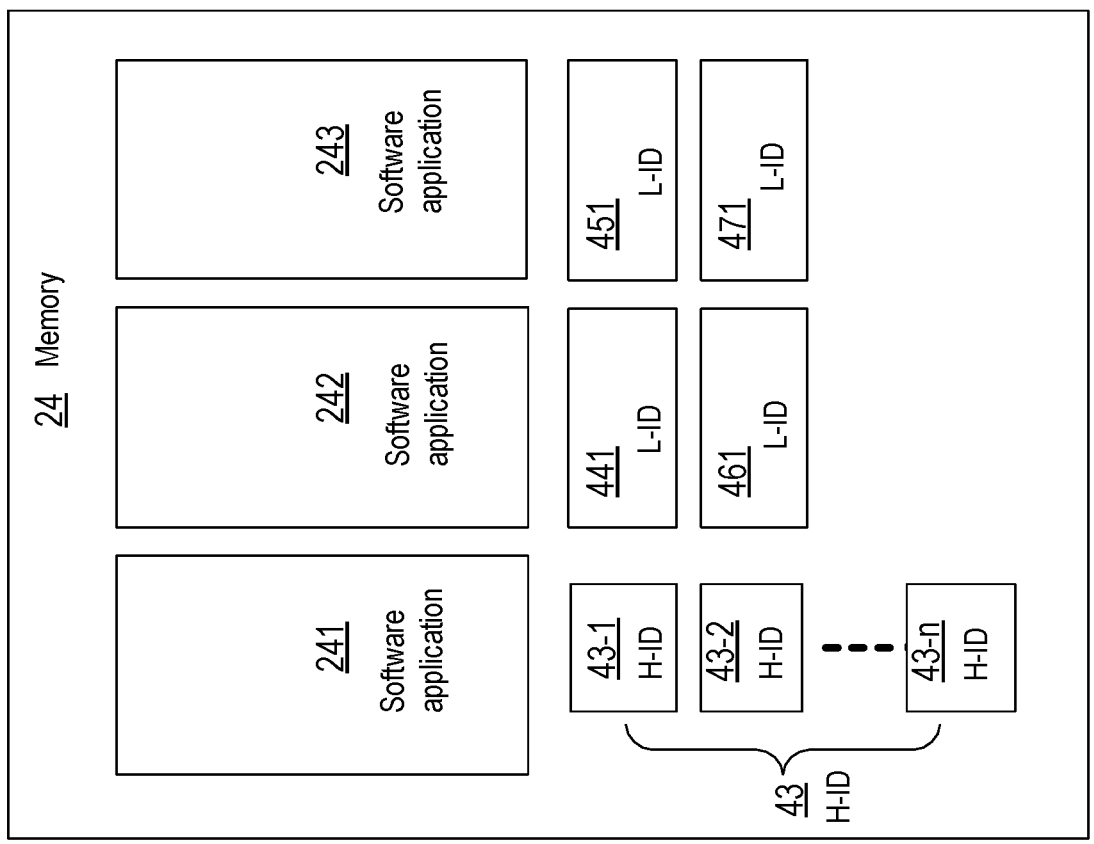
FIG. 1B illustrates a memory of the system as shown in FIG. 1A according to some embodiments of the subject application.

FIG. 1B illustrates a memory of the system as shown in FIG. 1A according to some embodiments.

Referring to FIG. 1B, software (or software programs) or applications 241, 242, 243 are stored in the memory 24. Each of the software 241, 242, and 243 may be installed or loaded in the electronic device 2. Each of the software 241, 242, and 243 may be executed in the electronic device 2. Each of the software 241, 242, and 243 may be installed and loaded in the memory 24 of the electronic device 2. Each of the software 241, 242, and 243 may be executed by the control module 21 the electronic device 2.

The software 241 may include, for example but is not limited to, a control program (e.g., operating system (OS) software, detection software to detect congestion of communication channels between electronic device 2 and electronic device(s) 4, or other software(s)) that may help or facilitate controlling the electronic device 2. The software 241 may also help or facilitate controlling the electronic device 4.

Referring back to FIG. 1A, the electronic device 3 may include driver(s) which helps or facilitates the software 241 controlling the electronic device(s) 4. The electronic device 3 may include driver(s) which cooperates with the software 241 to control the electronic device(s) 4. The driver of the electronic device 3 may support the function(s) provided by the software 241 to control the electronic device(s) 4. The electronic device 3 may include firmware(s) which helps or facilitates the software 241 controlling the electronic device (s) 4. The electronic device 3 may include firmware(s) which corporates with the software 241 to control the electronic device(s) 4. The firmware(s) of the electronic device 3 may support function(s) provided by the software 241 to control the electronic device(s) 4.

Referring to FIG. 1B, the software 242 may include, for example but is not limited to, game software. Some embodiments include remote control software (e.g., for surgical operation, surveillance, rescue, scout/reconnaissance, manufacture, assembly, bomb removal or other purpose(s)).

Software 241 may support software 242. For example, the software 241 may generate data (or commands) to control the electronic device(s) 4 in accordance with profile(s) of the software 242. For example, the software 241 may generate data (or commands) to control the electronic device(s) 4 in accordance with profile(s) of the software 242. For example, the software 241 may generate data (or commands) to adjust volume (or other audio setting(s)) of the electronic device 4 (e.g., audio headset 4) in accordance with configuration or profile of the software 242 such that user may hear or receive sound effect that conforms to the configuration or profile of software 242. In other words, data transmitted between the electronic device 2 and the electronic device 4 may be associated with software 242.

For example, the software 241 may generate data or command(s) (e.g., haptic command(s)) to control a vibrator of the electronic device 4 (e.g., audio headset 4 or mouse 4) in accordance with configuration or profile of the software 242 such that user may be notified or alerted.

For example, software 241 may generate data or command(s) to control the software 242 in accordance with data received from the electronic device(s) 4. For example, software 241 may generate data or command(s) to cooperate with the software 242 in accordance with data received from the electronic device(s) 4 (e.g., a mouse). For example, software 241 may help software 242 displaying motion in a display (not shown in FIG. 1A). For example, if configuration or profile of software 242 is relatively sensitive to movement in an x-axis (of the mouse), software 241 may help software 242 creating corresponding or relevant command(s) to respond data received from the mouse.

Data from the software 242 may be further processed by the software 241. For example, in accordance with the configuration or profile of the software 242, footstep (sound effect data or command(s)) from the software 242 may be amplified by the software 241 and then output to an electronic device 4 (e.g., an audio headset or a speaker). For example, different haptic commands from the software 242 are amplified or reduced by the software 241 and then transmitted to an electronic device 4 (e.g., a game pad, a simulator, or a surgeon console). For example, signals from an electronic device 4 (e.g., a mouse, a joy stick, a simulator, or a surgeon console) are processed by software 241. For example, signals from an electronic device 4 (e.g., a mouse, a joy stick, a simulator, or a surgeon console) are processed by software 242. For example, signals from an electronic device 4 (e.g., a mouse, a joy stick, a simulator, or a surgeon console) are processed by software 241 and 242.

The software 241 may help generating commands to the electronic device(s) 4. For example, the software 241 may help generating commands to control illumination component(s) (e.g., light emitting devices (LEDs) on the electronic device 4. The software 241 may help generating commands to control fan of an electronic device 4. The software 241 may help generating commands to control a display on an electronic device 4. The software 241 may help generating commands to the control module 28 to further control a power supply of the electronic device 2. The software 241 may help generating commands to the control module 28 to further control light emitting device(s) of the electronic device 2. The software 241 may help generating commands to the control module 28 to further control fan(s) of the electronic device 2.

Software 241 may include a utility engine. Software 241 helps a user to have custom parameters/configurations for an electronic device 4. Software 241 helps a user to create various profiles and modes for the electronic devices 4, which define different action(s), lighting effect(s) or other settings of the electronic device(s) 4, and adjust settings for human interface devices 4. According to certain embodiments, software 241 helps user to configure lighting effects, actions, or other settings of the electronic device(s) 4 in accordance with a profile associated with a specific game or program (e.g., software 242). Even for a single profile, software 241 may help the user to create different modes in an electronic device 4. Each mode has different settings in an electronic device for a task within a program (e.g., the software 242). For example, when a game program (e.g., software 242) is executed, and the profile may have various modes for different characters that the user might select (e.g., a medic, a sniper or other role), and the settings/parameters/configurations of the electronic device(s) 4 can be switched between these modes accordingly. Each of the profiles, modes, settings, parameters, and configurations of the electronic device(s) 4 may be program-dependent. For example, each of the profiles, modes, settings, parameters, and configurations of the electronic device(s) 4 may be changed or varied in accordance with software 241 stored in the memory 24. For example, each of the profiles, modes, settings, parameters, and configurations of the electronic device(s) 4 may be changed or varied in accordance with software 242 stored in the memory 24. For example, each of the profiles, modes, settings, parameters, and configurations of the electronic device(s) 4 may be changed or varied in accordance with software 243 stored in the memory 24.

In some embodiments, each of the profiles, modes, settings, parameters, and configurations of the electronic device (s) 4 may be time-varied.

The software 241 may be associated with the software 242. The data or command(s) from the software 242 may be processed by the software 241. The software 241 may generate data or command(s) to be transmitted to electronic devices 4. The data or command(s) received from the electronic devices 4 may be processed by the software 241. The software 241 may generate data or command(s) to be transmitted to the software 242.

The software 241 may help controlling data transmission between the electronic devices 2 and 4. The software 241 may help controlling data transmission between the software 242 and the electronic devices 4. The software 241 may check whether command(s) or data from the software 242 is successfully transmitted to the electronic device 4. The software 241 may check whether command(s) or data from the electronic devices 4 is successfully received. If an interruption of data transmission (or interactions) between the devices 2 and 4 on a communication channel or pipe occurs (or being detected), the software 241 may freeze or suspend a state of data transmission (e.g., a receiving state or a transmitting state) and keep parameters or configurations of the electronic device 2.

FIG. 1C illustrates software stored in the memory as shown in FIG. 1B according to some embodiments of the subject application.

Referring to FIG. 1C, software 243 may include programs or applications 511, 521, 531, 541, 551, and 561. Program 511 may help or facilitate establishment of communication channel 51. Program 521 may help or facilitate establishment of communication channel 52. Program 531 may help or facilitate establishment of communication channel 53. Program 541 may help or facilitate establishment of communication channel 54. Program 551 may help or facilitate establishment of communication channel 55. Program 561 may help or facilitate establishment of communication channel 56.

Referring back to FIG. 1B, lower-level identifiers (L-IDs) 441, 451, 461, and 471 are stored in the memory 24 of the electronic device 2. Each of the L-IDs 441, 451, 461, and 471 refers to identification for relatively lower layers. For example, the relatively lower layers may refer to the physical layer (Layer 1), the data link layer (Layer 2), the network layer (Layer 3), and/or the transport layer (Layer 4) in the OSI model. One L-ID is used to help or facilitate establishment of a communication channel in accordance with one communication protocol (including, but not limited to Bluetooth communication protocol, a Wi-Fi communication protocol, a proprietary communication protocol (e.g., proprietary wireless 2.4 GHz data communication protocol), USB communication protocol, Thunderbolt communication protocol, Ethernet communication protocol). The L-ID may include a Bluetooth Address (BD_ADDR) (for the Bluetooth protocol), a Vendor ID (VID) or a Product ID (PID) (for the USB protocol), a Service Set Identifier (SSID) (for the Wi-Fi (IEEE 802.11) protocol), MAC address (for the Ethernet protocol), or other communication protocol-associated data. The L-ID may include an silicon ID (or manufacture ID) of a controller of electronic device 4 (e.g., the control module 41 as shown in FIG. 2B), which is also marked on the controller during manufacture. The L-ID may include a device serial number of the electronic device 4.

A set of higher-level identifiers (H-ID) 43 is stored in the memory 24. The H-ID set 43 may include H-ID 43-1, H-ID 43-2, . . . , H-ID 43-n, where n is a positive integer. According to certain embodiments, each H-ID of at least a subset of the H-ID set 43 may refer to identification or verification of relatively higher layer(s). For example, the relatively higher layer(s) may be refer to the session layer (Layer 5), the presentation layer (Layer 6), and/or application layer (Layer 7) in the OSI model (https://en.wikipedia.org/wiki/OSImodel). An electronic device 4 has one unique H-ID (e.g., 43-1). Each of H-IDs of at least a subset of the H-ID set 43 may help the electronic device 2 in identifying each of the electronic devices 4. The software 241 of electronic device 2 may verify the H-ID to identify the electronic device(s) 4.

According to certain embodiments, an electronic device 4 has one unique H-ID (e.g., H-ID 43-1). The unique H-ID represents the electronic device 4. The unique H-ID may be associated with a type of the electronic device 4, which may include, for example but is not limited to, "human interface device," "audio," "keyboard," "mouse," "remote controller," "joystick," "gamepad," or the like.

The unique H-ID may be associated with a class of the electronic device 4, which may include, for example but is not limited to, "wireless audio headset," "wired headset," "wireless media headset," "wired media headset," "keyboard," "single color keyboard," "RGB keyboard," "high end mouse," "low end mouse," "Bluetooth headset," "USB wired headset," "Bluetooth headset with a microphone," "USB wired audio headset with a microphone," "keyboard without backlights," "keyboard with a single color backlight," "keyboard with RGB backlights," "mouse with high DPI (dots per linear inch) and backlights," "mouse with low DPI" or other functional information. The unique H-ID may include an alphanumeric sequence, according to certain embodiments.

The unique H-ID may include a random number, which is generated by a processor, a controller (e.g., the control module 41 as shown in FIG. 2B), a key generator, or other circuitry, with or without the help of firmware. The unique H-ID may include an universally unique identifier (UUID) (please see https://en.wikipedia.org/wiki/Universally unique identifier). The H-ID may be generated by the electronic device 4.

In some embodiments, the unique H-ID may be associated with protocol data or protocol information. The unique H-ID may be derived from the data or information of protocol used to establish a communication channel between the electronic devices 2 and 4. The unique H-ID may be associated with the data or information of the electronic device 4. The unique H-ID may be derived from the data or information of the electronic device 4. The unique H-ID may be associated with the respective L-IDs of the electronic device 4. The unique H-ID may be derived from the respective L-IDs of the electronic device 4. This sentence is repeated above at the end of paragraph above In some embodiments where a communication channel between the electronic devices 2 and 4 is established in accordance with a USB communication protocol, the H-ID of the electronic device 4 may be derived from standard information or L-ID(s) of USB communication protocol, for example but is not limited to, a Vendor ID, a Products ID, the firmware version, the serial number, and string descriptors.

In some embodiments of the subject application where a communication channel between the electronic devices 2 and 4 is established in accordance with one wireless communication protocol (e.g., the Bluetooth communication protocol, a Wi-Fi communication protocol, or a proprietary communication protocol), the H-ID of the electronic device 4 may be derived from standard information or L-ID(s) of the wireless communication protocol, for example but is not limited to a pairing ID. For the example where the communication follows the Blue tooth communication protocol, the pairing ID includes a public address.

In some embodiments where the communication follows the Ethernet protocol, the unique H-ID may be derived from a media access control (MAC) address of the electronic device 4. In some embodiments, the unique H-ID may be derived from a device serial number of the electronic device 4. In some embodiments, the unique H-ID may be derived from a silicon ID of a control module 41 of the electronic device 4 (e.g., the silicon ID may be generated under the physical unclonable function or the physical untraceable function (PUF)). In some embodiments, the unique H-ID may be derived from the identifier indicating the type of the electronic device 4. In some embodiments, the unique H-ID may be derived from the identifier indicating the class of the electronic device 4.

In some embodiments, the H-ID may be derived a combination of some of the mechanism as discussed above. For example, the H-ID may be derived a combination of any two or more selected from the followings: an device serial number of the electronic device 4, a product ID of the electronic device 4, an MAC address, an UUID, a silicon ID of the electronic device 4 or other parameters.

The memory 24 may include a buffer or a cache (not shown in the FIG. 1A or FIG. 1B) for data transmission between the electronic devices 2 and 4.

FIG. 2A illustrates an electronic device according to some embodiments of the subject application.

Referring to FIG. 2A, the electronic device 4a includes a control module 41, a memory 42, and communication modules 44, 45, and 46.

The control module 41 may include a controller and a system-on-chip. The control module 41 may be associated with the electronic device 2. The control module 41 may be associated with the software 241 of the electronic device 2. The control module 41 may be associated with the software 242 of the electronic device 2. The control module 41 may be associated with the software 241 and 242 of the electronic device 2. For example, the electronic device 2 may control the electronic device 4 by transmitting data or command(s) to the control module 41 of the electronic device 4. The software 241 of the electronic device 2 may control the electronic device 4 by transmitting data or command(s) to the control module 41. The software 242 of the electronic device 2 may control the electronic device 4 by transmitting data or command(s) to the control module 41. Data or command(s) to be transmitted to the electronic device 2 may be processed by the control module 41. Data or command(s) to be transmitted to the electronic device 2 may be generated by the control module 41. Data or command(s) for the electronic device 4 may be processed by the control module 41. The control module 41 may control data transmission between the electronic device 2 and 4a. The control module 41 may check whether commands or data are successfully transmitted to the electronic device 2. The control module 41 may check whether commands or data sent by the electronic device 2 are successfully received. If an interruption of data transmission (or interactions) between the electronic devices 2 and 4a on a communication channel occurs (or being detected), the control module 41 may freeze or suspend a state of data transmission (e.g., a receiving state or a transmitting state) and keep parameters or configurations of the electronic device 4a intact.

The communication module 44 may include a wireless communication module or a wired communication module. The communication module 45 may include a wireless communication module or a wired communication module. The communication module 46 may include a wireless communication module or a wired communication module.

The memory 42 may include, for example but is not limited to, a volatile memory (e.g., a random access memory (RAM), Dynamic Random Access Memory (DRAM), Static Random Access Memory (SRAM)), a flash memory, or other types of memory or memory module(s). An H-ID 43-1 and L-IDs 441, 451, and 461 are stored in the memory 42. The memory 42 in the electronic device 4a may function as a buffer or a cache for data transmission between the electronic devices 2 and 4a.

The electronic device 4a has one unique H-ID 43-1, which may be transmitted to the electronic device on a communication channel. Upon receipt of the H-ID 43-1 from the electronic device 4a, the electronic device 2 may compare the H-ID 43-1 received from the electronic device 4a with the H-ID 43-1 stored in the memory 24 of the electronic device 2. Upon receipt of the H-ID 43-1 from the electronic device 4, the software 241 of the electronic device 2 may identify the electronic device 4a by comparing the H-ID 43-1 received from the electronic device 4a with the H-ID 43-1 stored in the memory 24 of the electronic device 2. Once the two H-IDs 43-1 are matched, the electronic device 4a and the electronic device 2 may be linked (or connected) for data communication (e.g., the electronic device 4a is known to the electronic device 2), and the electronic device 2 may notify the electronic device 4a or identification or verification result.

Each of the communication modules 44, 45, and 46 is used for establishing a communication channel or pipe to the electronic device 2 in accordance with one communication protocol. The memory 42 of the electronic device 4a shown in FIG. 2A stores L-IDs 441, 451, and 461. The L-ID 441 corresponds to the communication module 44 and the corresponding communication protocol. The L-ID 451 corresponds to the communication module 45 and the corresponding communication protocol. The L-ID 461 corresponds to the communication module 46 and the corresponding communication protocol. One L-ID is used for establishing a communication channel according to one communication protocol (e.g., Bluetooth communication protocol, a Wi-Fi communication protocol, a proprietary communication protocol (e.g., proprietary wireless 2.4 GHz data communication protocol), USB communication protocol, Thunderbolt communication protocol, Ethernet communication protocol or other protocol(s)).

In FIG. 2A, the communication module 44 and the L-ID 441 may help or facilitate establishment of a communication channel or pipe to the electronic device 2. The communication module 45 and the L-ID 451 may help or facilitate establishment of a communication channel or pipe to the electronic device 2. The communication module 46 and the L-ID 461 may help or facilitate establishment of a communication channel or pipe to the electronic device 2.

In FIG. 2A, a generator 48 of the electronic device 4 the H-ID may be used to construct an unique H-ID of the electronic device 4a. In some embodiments, the generator 48 may be a circuit separated from the control module 41. In some embodiments, the generator 48 may be integrated within the control module 41. In some embodiments, the generator 48 may be implemented as a program (either software or firmware) executed by the control module 41.

FIG. 2B illustrates another electronic device according to some embodiments of the subject application.

Referring to FIG. 2B, the electronic device 4b includes a control module 41, a memory 42, communication modules 46 and 47, and a generator 48.

The control module 41 may include a controller and a system-on-chip. Data or command(s) to be transmitted to the electronic device 2 may be processed by the control module 41. Data or command(s) to be transmitted to the electronic device 2 may be generated by the control module 41. Data or command(s) received from the electronic device 2 may be processed by the control module 41. The control module 41 may control data transmission between the electronic device 2 and 4b. The control module 41 may check whether commands or data are successfully transmitted to the electronic device 2. The control module 41 may check whether commands or data sent by the electronic device 2 are successfully received. If an interruption of data transmission (or interactions) between the electronic devices 2 and 4b on a communication channel occurs (or being detected), the control module 41 may freeze or suspend a state of data transmission (e.g., a receiving state or a transmitting state) and keep parameters or configurations of the electronic device 4b intact.

The communication module 46 may include a wireless communication module or a wired communication module. The communication module 47 may include a wireless communication module or a wired communication module. The memory 42 may include, for example but is not limited to, a volatile memory (e.g., a random access memory (RAM), Dynamic Random Access Memory (DRAM), Static Random Access Memory (SRAM)), a flash memory, or other types of memory or memory module(s). An H-ID 43-2 and L-IDs 461, and 471 are stored in the memory 42. The memory 42 in the electronic device 4b may function as a buffer or a cache for data transmission between the electronic devices 2 and 4b.

The electronic device 4b has one unique H-ID 43-2, which may be transmitted to the electronic device on a communication channel. Upon receipt of the H-ID 43-2 from the electronic device 4b, the electronic device 2 may compare the H-ID 43-2 received from the electronic device 4b with the H-ID 43-2 stored in the memory 24 of the electronic device 2. Upon receipt of the H-ID 43-2 from the electronic device 4, the software 241 of the electronic device 2 may identify the electronic device 4b by comparing the H-ID 43-2 received from the electronic device 4a with the H-ID 43-2 stored in the memory 24 of the electronic device 2. Once the two H-IDs 43-2 are matched, the electronic device 4b and the electronic device 2 may be linked (or connected) for data communication (e.g., the electronic device 4b is known to the electronic device 2), and the electronic device 2 may notify the electronic device 4b of identification or verification result.

Each of the communication modules 46 and 47 is used for establishing a communication channel or pipe to the electronic device 2 in accordance with one communication protocol. The memory 42 of the electronic device 4b shown in FIG. 2A stores L-IDs 461 and 471. The L-ID 461 corresponds to the communication module 46 and the corresponding communication protocol. The L-ID 471 corresponds to the communication module 47 and the corresponding communication protocol. One L-ID is used for establishing a communication channel according to one communication protocol (e.g., Bluetooth communication protocol, a Wi-Fi communication protocol, a proprietary communication protocol (e.g., proprietary wireless 2.4 GHz data communication protocol), USB communication protocol, Thunderbolt communication protocol, Ethernet communication protocol or other protocol(s)).

In some embodiments, the H-ID may be constructed by a program (either firmware or software) executed by the control module 41 of the electronic device 4. In some embodiments, the H-ID may be constructed by the generator 48 of the electronic device 4. The generator 48 may include a circuit separated from the control module 41. The generator 48 may be integrated within the control module 41 in some other embodiments of the subject application. The generator 48 may be implemented as a program (either software or firmware) executed by the control module 41.

In FIG. 2B, the communication module 46 and the L-ID 461 may help or facilitate establishment of a communication channel or pipe to the electronic device 2. The communication module 47 and the L-ID 471 may help or facilitate establishment of a communication channel or pipe to the electronic device 2.

Referring back to FIG. 1A, a communication channel between one electronic device 2 and one electronic device 4 may be changed or switched to another communication channel, either automatically or manually, in order to have a better communication quality, to charge the battery, to avoid mutual interference, or to have convenient or comfortable user experience.

In some embodiments of the subject application, channel switch between one electronic device 2 and one electronic device 4 (e.g., from a wireless communication channel to a wired communication channel) may be triggered by scenarios which include, for example but is not limited to, charging battery of the electronic device 4 whose power is running low, avoiding mutual radio interference in a multiple-device environment.

In some embodiments of the subject application, channel switch between one electronic device 2 and one electronic device 4 (e.g., from a wireless communication channel to another wireless communication channel) may be triggered by scenarios which include, for example but is not limited to, looking for a channel which provides better performance (e.g., transmission speed, signal quality, etc.).

FIG. 3 illustrates data according to some embodiments of the subject application.

Referring to FIG. 3, data 6 may include portions 61 and 62. It is contemplated that data 6 may include more or less portion(s) (not shown in FIG. 3). The data 6 may be generated by the electronic device 2 or by electronic device 4. The data 6 may be transmitted by the electronic device 2 or by electronic device 4. The data 6 may be received by the electronic device 4 or by electronic device 2.

Figure 4:
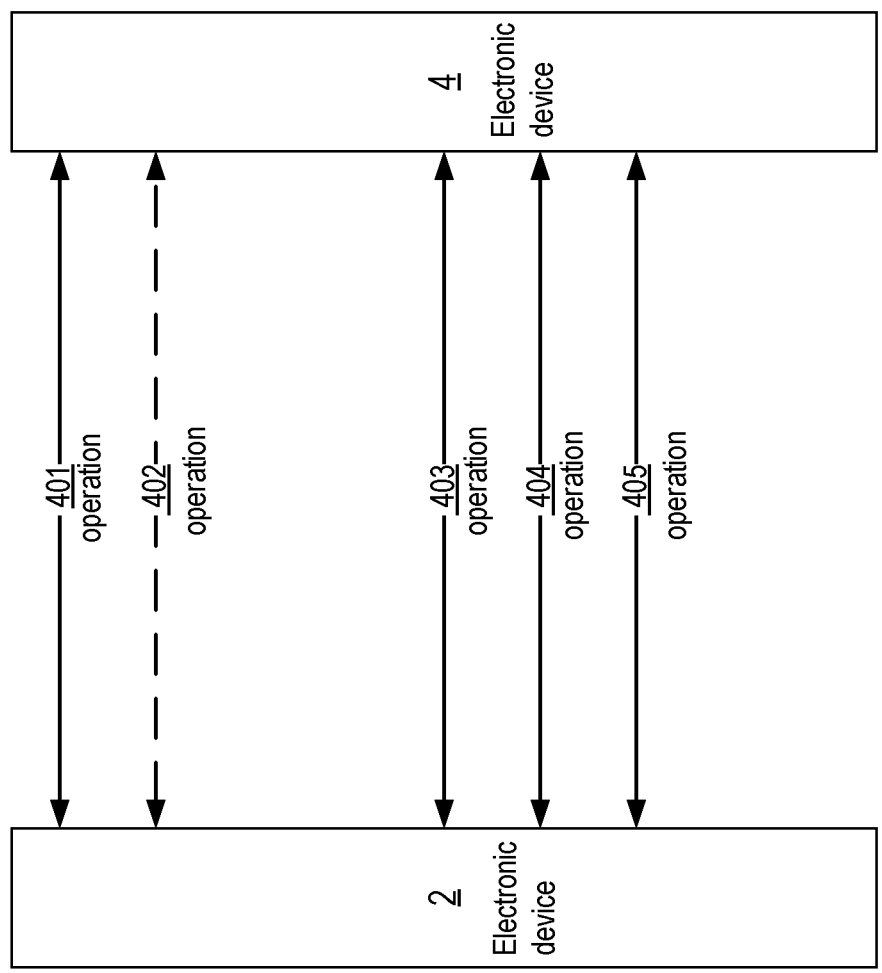
FIG. 4 illustrates interactions between one electronic device and another electronic device, according to some embodiments of the subject application.

FIG. 4 illustrates interactions between one electronic device 2 and another electronic device 4 according to some embodiments of the subject application.

Referring to FIG. 4, the electronic device 2 generates data 6 (as shown in FIG. 3) to be transmitted to the electronic device 4. In some embodiments, the electronic device 4 generates data 6 (as shown in FIG. 3) to be transmitted to the electronic device 2.

According to some embodiments, a communication channel 51 is established between electronic device 2 and electronic device 4 with the assistance of electronic device 3 (e.g., a dongle that is communicatively coupled to electronic device 2). In operation 401, the electronic device 2 transmits the data 6 to the electronic device 4 on a communication channel 51 (e.g., a Bluetooth communication channel). A notification of successful receipt of a portion of data 6 (e.g., the portion 61 of data 6 as shown in FIG. 3) may be transmitted to the electronic device 2 from the electronic device 4 in the operation 401. Details of operation 401 will be described below with accompanying FIG. 5.

In operation 402, an interruption of the interactions between electronic devices 2 and 4 on the communication channel 51 occurs. The interruption of the interactions between electronic devices 2 and 4 on the communication channel 51 may be detected by the electronic device 2 or by electronic device 4. Interruption of the interactions between electronic devices 2 and 4 may be caused by, for example but is not limited to, traffic congestion, deterioration of communication quality (e.g., relatively low Signal Noise Ratio), power blackout or cut-off, channel switch, etc.

Interruption may be detected via some mechanisms, such as time-out mechanism, check-sum mechanism or other suitable mechanism(s). For example, the electronic device 2 may detect the interruption if the electronic device 2 does not receive a response (e.g., the notification of successful receipt of the portion 61 of data 6) from the electronic device 4 within a time period. For example, interruption may be detected or determined by the electronic device 4 if no data or portion of data is received within a time period.

For purposes of explanation, assume that prior to interruption, the portion 61 of data 6 was successfully received by the electronic device 4, but the portion 62 of data 6 was not successfully received by the electronic device 4. If interruption is detected, the electronic device 2 may freeze or suspend a state of data transmission or interactions (e.g., suspend transmitting the portion 62 of the data 6). If interruption is detected, the electronic device 2 may store (or buffer or cache) the portion 62 of the data 6 in the memory 24. The data 6 (including portions 61 and 62) is associated with the electronic device 2. The data 6 (including portions 61 and 62) is associated with the electronic device 4. The data 6 (including portions 61 and 62) associates with the configurations of the electronic device 4.

If interruption is detected, the electronic device 4 may freeze or suspend a state of data transmission or interactions (e.g., suspend receiving any data). If interruption is detected, the electronic device 4 may store (or buffer or cache) the portion 61 of the data 6, which was successfully received, in the memory 42.

In operation 403, another communication channel 52 (e.g., a USB communication channel) between the electronic devices 2 and 4 is established with the assistance of electronic device 3 (e.g., a dongle that is communicatively coupled to electronic device 2). Further, in operation 403, another available communication channel 52 (e.g., a USB communication channel) between the electronic devices 2 and 4 is detected. The operation 403 may be automatically performed by the electronic device 2 (e.g., by module 241 in FIG. 1B). Alternatively, the operation 403 may be automatically performed by the electronic device 4. In some embodiments, the operation 403 may be manually performed.

Subsequent to channel switch as described in operation 403, the electronic devices 2 and 4 perform a link operation for data communication on the communication channel 52 in operation 404. The electronic device 2 may query the electronic device 4 to transmit the unique H-ID (e.g., H-ID 43-1) on the communication channel 52. The H-ID (e.g., H-ID 43-1) is unique for the electronic device 4. The electronic device 4 may transmit the unique H-ID (e.g., H-ID 43-1) to the electronic device 2 on the communication channel 52. A response may be sent by the electronic device 2 on the communication channel 52 if the H-ID 43-1 was successfully received.

The electronic device 2 may use the received H-ID 43-1 to perform the link operation for data communication. For example, the electronic device 2 may compare the H-ID 43-1 received from the electronic device 4 with the H-ID 43-1 stored in the memory 24 of the electronic device 2. For example, if the H-ID 43-1 received from the electronic device 4 is identical to the H-ID 43-1 stored in the memory 24 of the electronic device 2, the electronic device 2 and the electronic device 4 are linked. In other words, the electronic device 4 is known to the electronic device 2. A notification of successful linking may be transmitted from the electronic device 2 to the electronic device 4.

If the electronic device 4 is known to the electronic device 2 (or the link operation is successful), the electronic device 2 may resume the state of data transmission (e.g., transmitting state) in operation 405. If the electronic device 4 is known to the electronic device 2 (or the link operation is successful), the electronic device 2 may transmit the portion 62 of the data 6 to the electronic device 4 on the communication channel 52 in operation 405. The electronic device 4 may receive the portion 62 of the data 6 from the electronic device 2 on the communication channel 52 in operation 405.

According to the interactions as illustrated and described with respect to FIG. 4, transmission of data 6 may be completed during channel switch (e.g., from communication channel 51 to communication channel 52) without reset or reconfiguration of the electronic device(s) 4. This is important because reset or reconfiguration of one electronic device(s) 4 may consume relatively great time. If some of the electronic devices 4 experience channel switch, relatively greater time is expected to reset or reconfigure these electronic devices 4.

The portion 62 of data 6, which was not successfully transmitted (or received) prior to channel switch, may be stored and transmitted (or received) on another communication channel (e.g., communication channel 52) to avoid reset or reconfiguration of the electronic device 4.

In some embodiments, the portion 61 of the data 6 stored in the memory 42 of the electronic device 4 may be wiped off from memory 42. The portion 61 of the data 6 stored in the memory 42 may be wiped off due to time-out (e.g., the time between operations 402 and 403). The portion 61 of the data 6 stored in the memory 42 may be wiped off due to accidental reset of the electronic devices 4 (e.g., the reset because of power blackout, cut-off, or crash). The portion 61 of the data 6 stored in the memory 42 may be wiped off due to accidental erasure, write errors, or read errors of the memory 42.

If the portion 61 stored in the memory 42 is cleaned, the electronic device 4 may transmit a unique H-ID (e.g., H-ID 43-1) and an indicator to the electronic device 2 on the communication channel 52 in operation 404. The indicator indicates that the portion 61 stored in the memory 42 is cleaned.

If the electronic device 4 is known to the electronic device (or the link operation is successful in operation 404), the electronic device 2 may transmit the data 6 (including the portions 61 and 62) to the electronic device 4 on the communication channel 52 in operation 405. The transmission of data 6 may be completed during channel switch (e.g., from communication channel 51 to communication channel 52) without reset or reconfiguration of the electronic device 4. This is important because reset or reconfiguration of the electronic device 4 may consume relatively great time.

In some embodiments, the portion 62 of the data 6 stored in the memory 24 of the electronic device 2 may be wiped off from memory 24. The portion 62 of the data 6 stored in the memory 24 may be wiped off due to time-out (e.g., the time between operations 402 and 403). The portion 62 of the data 6 stored in the memory 24 may be wiped off due to accidental reset of the electronic devices 4 (e.g., the reset because of power blackout, cut-off, or crash). The portion 62 of the data 6 stored in the memory 24 may be wiped off due to accidental erasure, write errors, or read errors of the memory 24.

If the portion 62 of the data 6 stored in the memory 24 of the electronic device 2 is wiped off. The electronic device 2 may initialize the electronic device 4 as a new device.

In some embodiments, if the electronic device 4 is not known to the electronic device (or the link operation is not successful in operation 404), the electronic device 2 may initialize the electronic device 4 as a new device.

Figure 5:
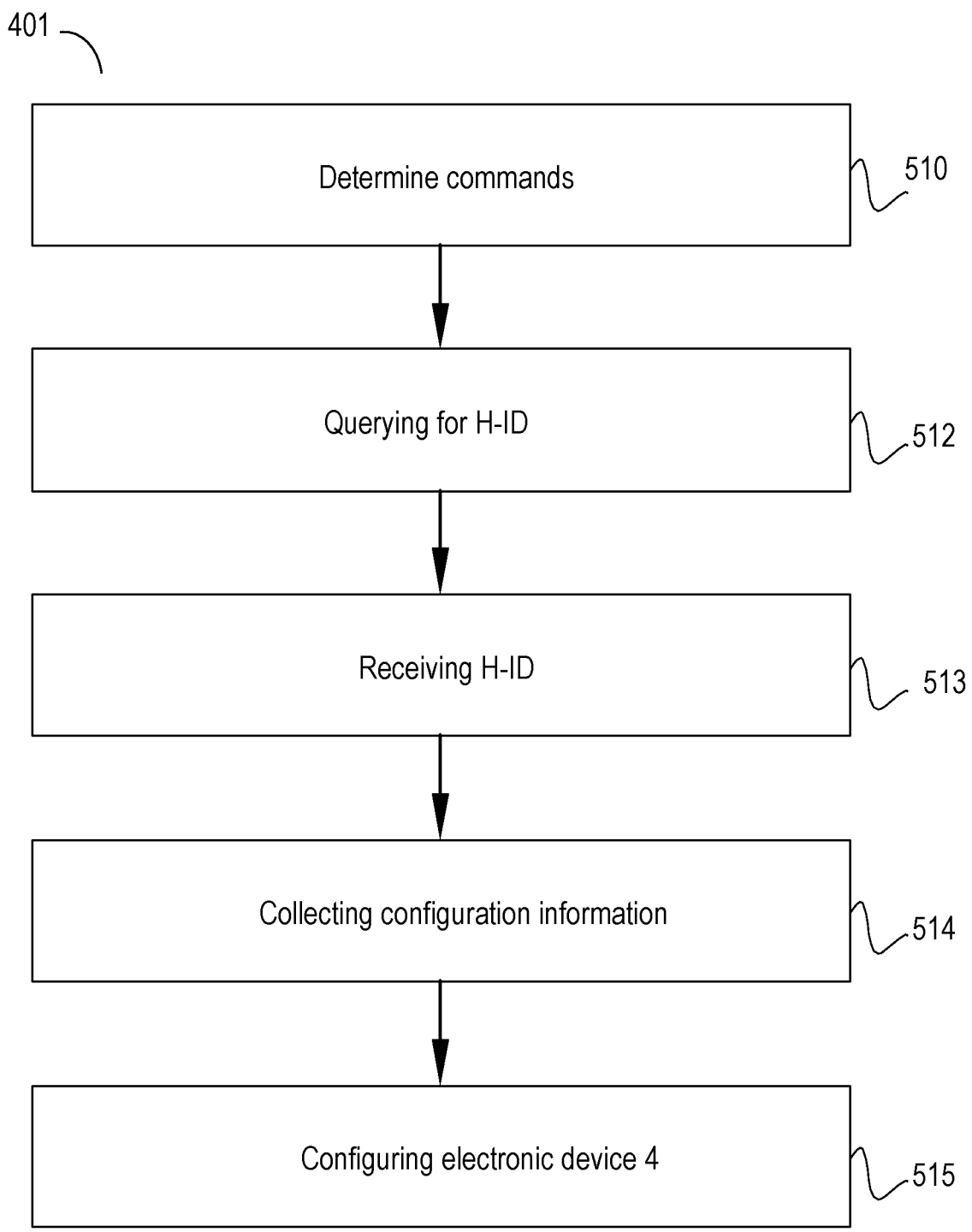
FIG. 5 illustrates interactions between one electronic device and another electronic device, according to some embodiments of the subject application.

FIG. 5 illustrates interactions between one electronic device and another electronic device according to some embodiments of the subject application.

Referring to FIG. 5, the operation 401 as illustrated and described with reference to FIG. 4 is further illustrated.

In some embodiments of the subject application where a communication channel (e.g., a USB channel) is established between the electronic device 2 and electronic device 4, the electronic device 2 and electronic device 4 may be connected by a USB cable. The electronic device 2 enumerates the electronic device 4 after detecting a USB connector is plugged in. The communication channel between the electronic device 2 and the electronic deice 4 is established in accordance with the USB communication protocol.

In some embodiments of the subject application where a communication channel (e.g., a wireless channel) is established between the electronic devices 2 and 4, the wireless communication channel may include a Bluetooth communication channel a Wi-Fi communication channel, a proprietary communication channel, and so forth.

In operation 510, the electronic device 2 (e.g., with the help of the software 241) may determine commands to query the electronic device 4 by using standard information of the associated communication protocol or L-ID(s) the electronic device 4.

For example, in one case where a USB channel is established between the electronic device 2 and electronic device 4, the electronic device 2 may use or access standard information of USB communication protocol or L-ID(s) of the electronic device 4 (e.g., a Vendor ID, a Products ID, the firmware version, the serial number, and string descriptors) to determine commands and parameters to query the electronic device.

For example, in one case where a wireless communication channel is established between the electronic devices 2 and 4, an identifier (ID) of the associated wireless communication protocol may be embedded in the data transmitted on the wireless communication channel. According to the embedded ID, the electronic devices 2 and 4 can discriminate whether the data is intended for this wireless communication channel. The ID embedded in the data may include a pairing ID. The ID embedded in the data may include L-ID(s) associated wireless communication protocol. The electronic device 2 may use or access the standard information of a pairing mechanism of the communication channel, such as a pairing ID or L-ID(s) associated with the wireless communication protocol, to determine commands to query the electronic device 4. The pairing ID may be stored in the electronic device 2. The pairing ID may be stored in the electronic device 4.

In operation 512, the electronic device 2 queries the electronic device 4 for the unique H-ID (e.g., H-ID 43-1 as shown in FIG. 1B).

The unique H-ID may include an alphanumeric sequence. The unique H-ID may include an universally unique identifier (UUID). The unique H-ID may be derived from protocol information used to establish communication channel between the electronic devices 2 and 4. The H-ID may be generated by the electronic device 4. The generated H-ID is stored in the memory 42 of the electronic device 4.

In operation 513, the electronic device 2 receives the H-ID from the electronic device 4 on the communication channel. The electronic device 2 stores the received H-ID in the memory 24.

In operation 514, the electronic device 2 collects configuration (or parameters) and capabilities of the electronic device 4. In some embodiments, the electronic device 2 may send a query command to the electronic device 4 to collect the configuration (or parameters) and capabilities of the electronic device 4 from the electronic device 4. In some embodiments, the electronic device 2 may collect the configuration (or parameters) and capabilities of the electronic device 4 from a database stored in the electronic device 2 (e.g., stored in the memory 24).

In operation 515, the electronic device 2 configures the electronic device 4 according to user's inputs, the configuration (or parameters), capabilities collected in operation 514, other parameter(s), or any combination of the aforesaid parameters. The module(s) described above may be implemented in hardware for relatively high speed with relatively great cost. The module(s) described above may be implemented in software for relatively low speed with relatively less cost.

FIG. 6 illustrates a smart dongle device supporting wireless communication with a host computer, according to some embodiments of the subject application. FIG. 6 shows at least two input devices (e.g., wireless keyboard 612, and wireless mouse 614) and a wireless audio headset 610 (e.g., wireless audio headset that includes a microphone that a user can use to send audio data to host computer). According to certain embodiments, smart dongle 616 includes a micro controller unit and is in the form of a USB plugged into host computer 618. Smart dongle 616 is a transceiver device that: 1) can receive and transmit data from host computer to the wireless keyboard, wireless mouse and wireless audio headset, and 2) can receive and transmit data from the wireless keyboard, wireless mouse, wireless audio headset to the host computer. Wireless keyboard 612, wireless mouse 614, wireless audio headset 610 are non-limiting examples of electronic devices 4. Smart dongle 616 is a non-limiting example of electronic device 3. Host computer 618 is a non-limiting example of an electronic device 2. Smart dongle 616 helps the wireless communication between host computer 618 and the wireless keyboard 612, wireless mouse 614 and wireless audio headset 610. According to certain embodiments, host computer 618 can send such multiplexed data to wireless computer peripheral devices 610, 612, 614 at low latency with the help of smart dongle 616. According to certain embodiments, non-limiting examples of low latency are as follows: (i) latency of approximately less than 2.5 milliseconds for data sent from wireless keyboard 612 to host computer 618 and from wireless mouse 614 to host computer 618, (ii) latency of approximately less than 12 milliseconds for data sent between wireless audio headset 610 and host computer 618. According to certain embodiments, non-limiting examples of low latency are as follows: (i) latency of approximately less than a range of 2 milliseconds to 3 milliseconds for data sent from wireless keyboard 612 to host computer 618 and from wireless mouse 614 to host computer 618, (ii) latency of approximately less than a range of 10 milliseconds to 14 milliseconds for data sent between wireless audio headset 610 and host computer 618.

Figure 7:
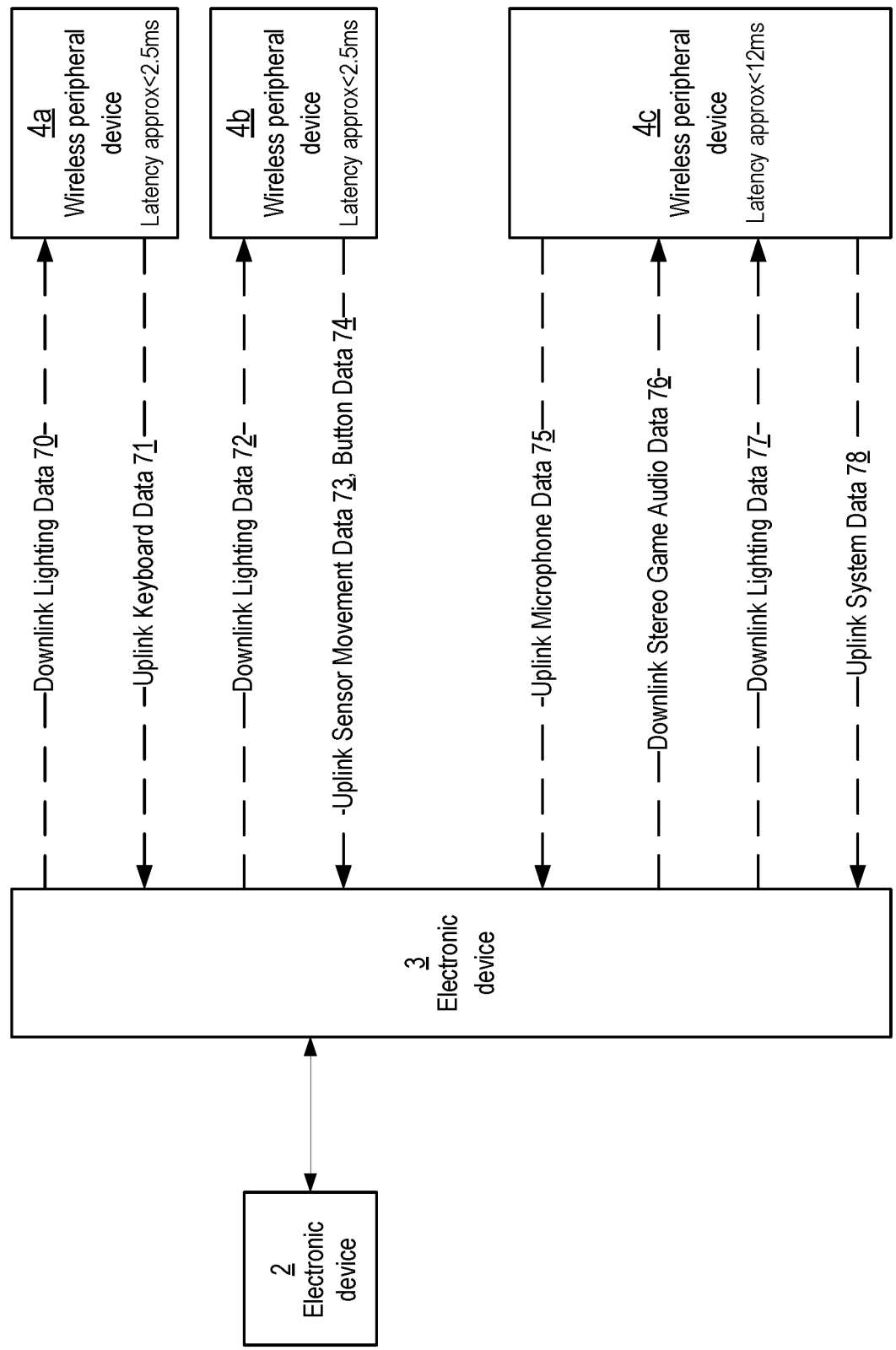
FIG. 7 illustrates the multiplexing of data that is sent to peripheral devices using a dongle, according to some embodiments of the subject application.

FIG. 7 illustrates the multiplexing of data that is sent to peripheral devices using a smart dongle, according to some embodiments of the subject application.

FIG. 7 shows electronic device 2 (such as a host computer, etc.,) sending data to multiple wireless electronic devices 4 (e.g., wireless computer peripheral devices 4a, 4b, 4c) with the help of electronic device 3 (e.g., smart dongle). As a non-limiting example, electronic device 2 (host computer) can multiplex keyboard data (e.g., downlink lighting data 70 that host computer wants to send to wireless keyboard 4a) with mouse data (e.g., downlink lighting data 72 that host computer wants to send to wireless mouse 4b) with audio data (e.g., downlink stereo game audio data 76 and downlink lighting data 77 that host computer wants to send to wireless audio headset 4c). FIG. 7 also shows, as non-limiting examples, communication of data from wireless keyboard 4a, wireless mouse 4b and wireless audio headset 4c to electronic device 2 (host computer). As non-limiting examples, communication of data from wireless keyboard 4a, wireless mouse 4b and wireless audio headset 4c to electronic device 2 include uplink keyboard data 71, uplink mouse sensor movement data 73, uplink mouse button data 74, uplink microphone data 75 and uplink system data 78. The smart dongle sends data from the wireless keyboard, wireless mouse and wireless audio headset on the same communication channel using the fixed time slots allotted to each of the peripheral devices (keyboard, mouse, headset) and while achieving low latency. According to certain embodiments, non-limiting examples of low latency are as follows: (i) latency of approximately less than 2.5 milliseconds for data sent from wireless keyboards to host computer (user's personal computer) 4a and from wireless mice 4b to host computer (e.g., user's personal computer), (ii) latency of approximately less than 12 milliseconds for data sent between wireless audio headset 4c and host computer (e.g., user's personal computer). According to certain embodiments, non-limiting examples of low latency are as follows: (i) latency of approximately less than a time period in a range of 2 milliseconds to 3 milliseconds for data sent from wireless keyboards to host computer (user's personal computer) 4a and from wireless mice 4b to host computer (e.g., user's personal computer), (ii) latency of approximately less than a time period in a range of 10 milliseconds to 14 milliseconds for data sent between wireless audio headset 4c and host computer (e.g., user's personal computer). In the case of audio data, the personal computer can send audio to the headset via the dongle (e.g., from a video playing on the personal computer) and the audio headset can send microphone data from the headset (e.g., user speaks into the microphone) to the personal computer via the dongle. In such a case, the smart dongle is able to achieve a latency that is less than 12 milliseconds for the audio communication. According to certain embodiments, the smart dongle is able to achieve a latency that is less than a time period in a range of 10 milliseconds to 14 milliseconds for the audio communication.

According to certain other embodiments, the types of wireless computer peripheral devices are not limited to keyboard 4a, mouse 4b and audio headset 4c. The types of wireless computer peripheral devices may vary from implementation to implementation. For example, wireless computer peripheral devices may also include electronic mouse mats, etc., in relation to their respective wireless communication with the host personal computer.

According to certain embodiments, the smart dongle communication management system uses the data structures, timing, buffer and frame format that are based on audio data structures, timing, buffer and frame format. As a non-limiting example, the smart dongle management system is based on a frame rate of 48 kilo hertz (kHz) sample rate with 16 bits of data per sample (bit depth). The embodiments are not restricted to 48 kHz sample rate with 16 bits of data per sample. The sample rate and bit depth may vary from implementation to implementation. Non-limiting examples of other sample rates can range from 44 kHz to 96 kHz.

According to certain embodiments, the audio-type frame format of sample rate ranging from 44 kHz to 96 kHz and bit depth (16 bits, 24 bits, or 32 bits) allows the smart dongle's communication management system to handle the fast moving audio data from the user's PC and the fast moving microphone data from the headset to the user's PC while at the same time allowing the smart dongle to create slots for transmitting data from the mouse and/or data from the keyboard to the user's PC without sacrificing the audio performance and whilst achieving low latency for the mouse data transmission and keyboard data transmission, as described herein.

According to certain embodiments, low latency is achieved by optimizing ACK packets (acknowledgment packets), sync packets, payloads, etc. As a non-limiting example, the payload can be minimized during transmission and the corresponding data can be reconstructed at the receiver. Such an optimization can be used for sending data from the wireless computer peripheral devices to the host computer as well as sending data from the host computer to the respective wireless computer peripheral devices. According to certain embodiments, the audio data sample rate can range anywhere between 44 kHz and 96 kHz. As a non-limiting example, if the audio data sample rate is set at 48 kHz for game audio data sent from host computer via smart dongle device to audio headset and set at 24 kHz for microphone data coming from audio headset via smart dongle to host computer, then the audio data packets in both directions are trimmed to reduce audio payload whilst accommodating to make room for communication with other devices such as wireless keyboards and wireless mice.

Figure 8:
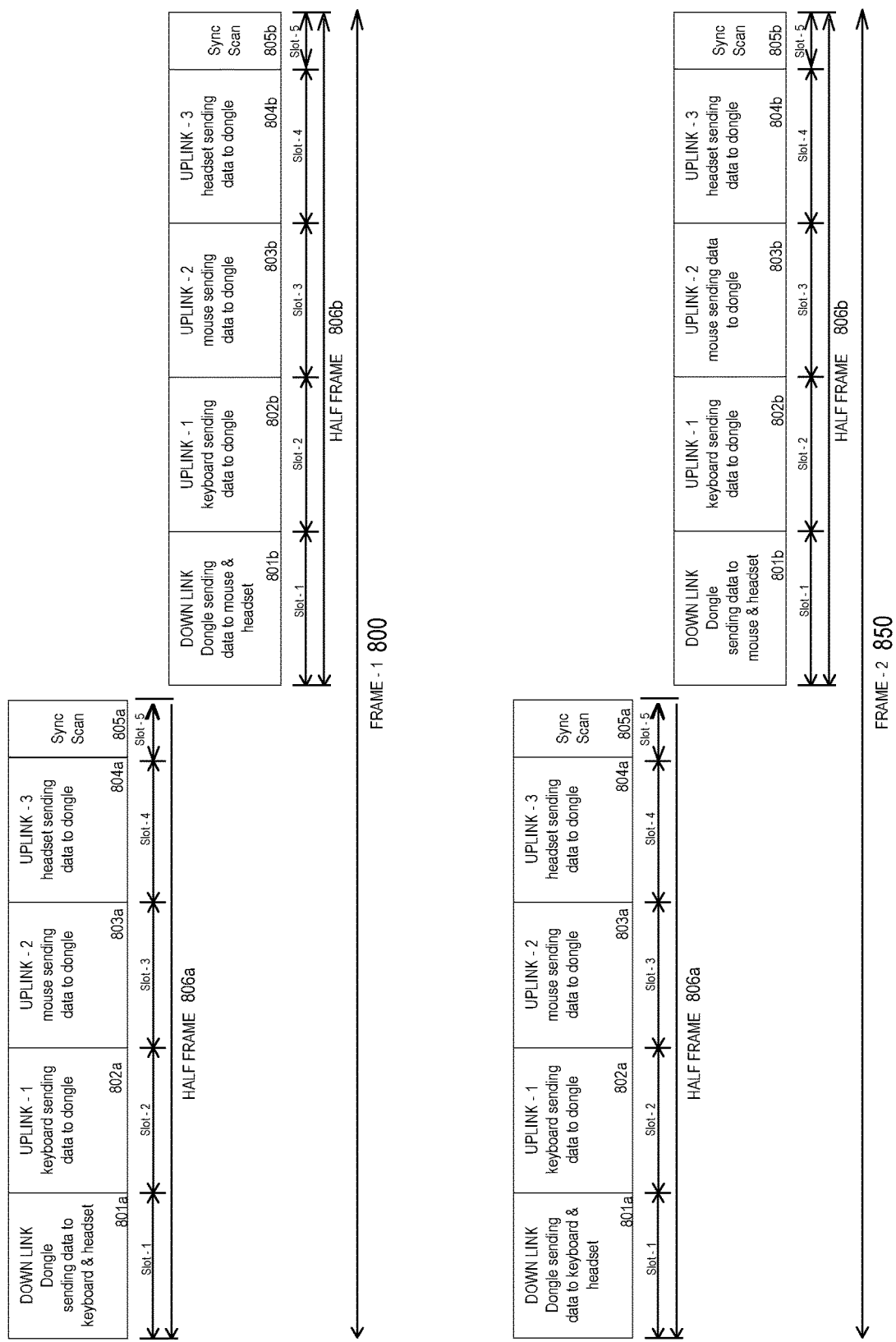
FIG. 8 illustrates fixed time slot assignments created by a smart dongle, according to some embodiments of the subject application.

According to certain embodiments, the smart dongle's communication management system creates fixed slots for the wireless audio, mouse and keyboard data transmission in the audio-type frame format of sample rate ranging from 44 kHz to 96 kHz and bit depth (16 bits, 24 bits, or 32 bits), as explained in greater detail herein with reference to FIG. 8.

Figure 9:
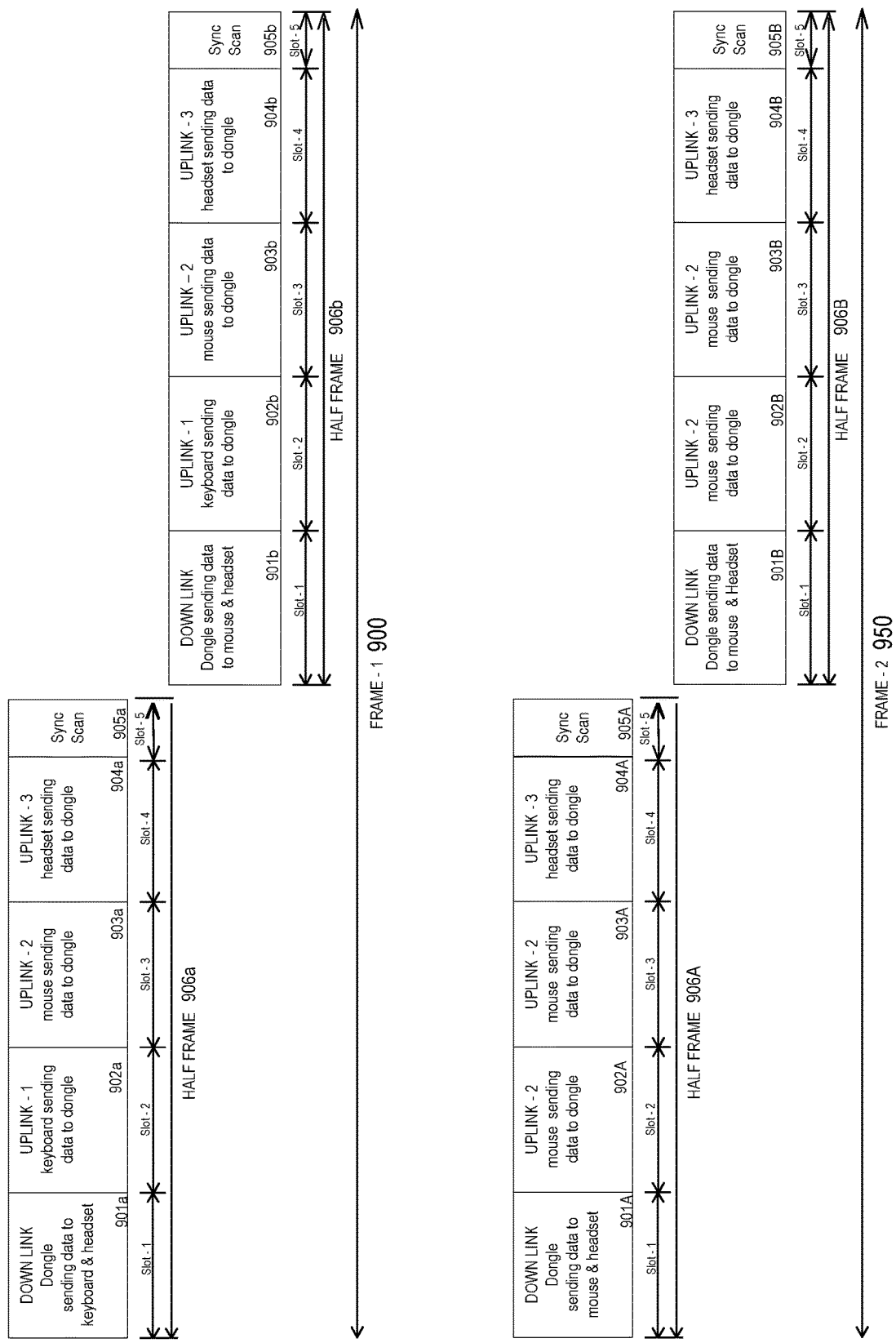
FIG. 9 illustrates time slots that are dynamically assigned and created by a smart dongle, according to some embodiments of the subject application.

According to certain other embodiments, the smart dongle's communication management system creates dynamic slots for the wireless audio, mouse and keyboard data transmission in the audio-type frame format of sample rate ranging from 44 kHz to 96 kHz and bit depth (16 bits, 24 bits, or 32 bits), explained in greater detail herein with reference to FIG. 9.

Figure 10:
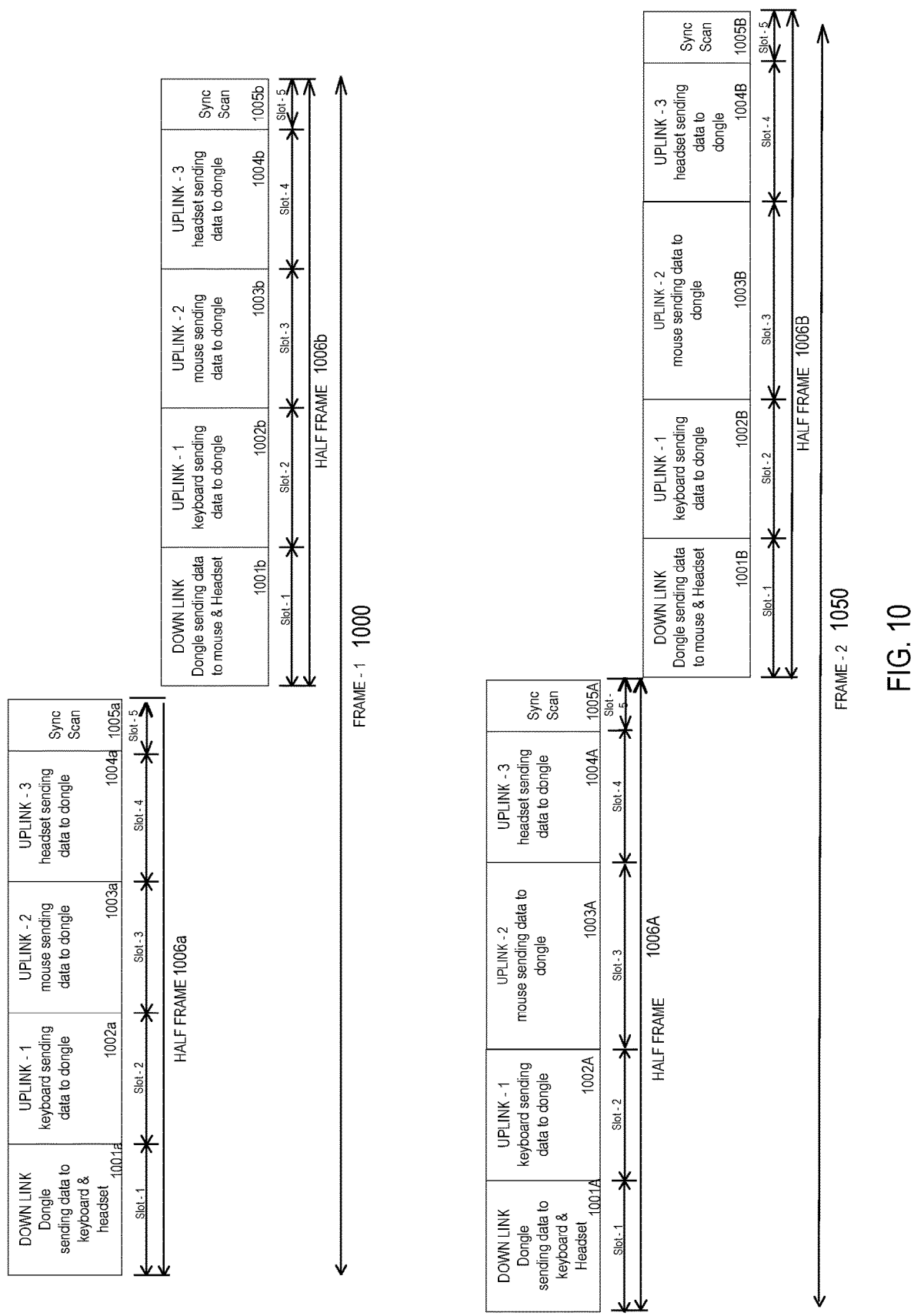
FIG. 10 illustrates payloads that are dynamically assigned and created by a smart dongle, according to some embodiments of the subject application.

According to certain other embodiments, the dongle's communication management system creates dynamic payloads with respect to the wireless audio, mouse and keyboard data transmission in the audio-type frame format of sample rate ranging from 44 kHz to 96 kHz and bit depth (16 bits, 24 bits, or 32 bits), explained in greater detail herein with reference to FIG. 10.

FIG. 8 illustrates fixed time slot assignments created by a smart dongle, according to some embodiments of the subject application. According to some embodiments, the smart dongle is a USB-based adapter device for wireless technology that has a micro controller unit and functions as a transmitter/receiver (transceiver). For purposes of explanation, assume that the following wireless devices have been paired with the smart dongle: 1) wireless audio headset, 2) wireless mouse, and 3) wireless keyboard. FIG. 8 shows time slots in frame-1 (800) and frame-2 (850) for data communication (digital transmission) between a host computer and wireless computer peripheral devices (wireless audio headset, wireless keyboard, wireless mouse) created by the smart dongle plugged into the host computer. Frame-1 (800) includes half frame (806*a*) and half frame (806*b*). Similarly, frame-2 (850) includes half frame (806*a*) and half frame (806*b*). Half frame (806*a*) shows downlink time slot (801*a*), uplink-1 time slot (802*a*), uplink-2 time slot (803*a*), uplink-3 time slot (804*a*), and syncing/scanning slot (805*a*), according to certain embodiments. Similarly, half frame (806*b*) shows downlink time slot (801*b*), uplink-1 time slot (802*b*), uplink-2 time slot (803*b*), uplink-3 time slot (804*b*), and syncing/scanning slot (805*b*).

According to certain embodiments, in downlink time slot (801*a*), the smart dongle sends data from host computer (e.g., user's PC) to the wireless keyboard and wireless audio headset. In uplink-1 (802*a*), the wireless keyboard sends data to the host computer, via the smart dongle. In uplink-2 (803*a*), the wireless mouse sends data to the host computer, via the smart dongle. In uplink-3 (804*a*), the wireless audio headset sends data to the host computer, via the smart dongle. According to certain embodiments, in downlink time slot (801*b*), the smart dongle sends data from host computer to the wireless mouse and wireless audio headset. In uplink-1 (802*b*), the wireless keyboard sends data to the host computer, via the smart dongle. In uplink-2 (803*b*), the wireless mouse sends data to the host computer, via the smart dongle. In uplink-3 (804*b*), the wireless audio headset sends data to the host computer, via the smart dongle.

According to certain embodiments, the smart dongle creates the time slots in frame-2 (850) in a similar manner as that of frame-1 (800).

Syncing/scanning time slot occurs at the end of each half frame, whereby the smart dongle scans the communication channels used in the communication between host computer and the wireless computer peripheral devices. The smart dongle scans the communication channels for interference. If interference is detected, then the smart dongle will use a different communication channel (syncing) for downlinks and/or uplinks. The number of wireless computer peripheral devices managed by the smart dongle can vary from implementation to implementation. The number of wireless computer peripheral devices that can be paired to the smart dongle for management can be X, where X is an integer that is less than 10.

According to certain embodiments, the shared downlink channel for sending data to the wireless keyboard and wireless audio headset or sending data to wireless mouse and wireless audio headset contains 16 bytes of data for wireless keyboard, 16 bytes of data for wireless mouse and 3.3 bits of data per sample of stereo game audio. According to certain embodiments, each uplink channel for either the wireless keyboard or wireless mouse contains 25 bytes of data. The uplink channel for audio data contains 3.3 bits of data per sample of mono microphone audio, according to certain embodiments.

FIG. 9 illustrates time slots that are dynamically assigned and created by a smart dongle, according to some embodiments of the subject application. According to some embodiments, the smart dongle has a micro controller unit. According to certain embodiments, the smart dongle communication management system uses the data structures, timing, buffer and frame format that are based on audio data structures, timing, buffer and frame format.

FIG. 9 shows time slots in frame-1 (900) and frame-2 (950) for data communication (digital transmission) between a host computer and wireless computer peripheral devices (wireless audio headset, wireless keyboard, wireless mouse) created by the smart dongle plugged into the host computer.

Frame-1 (900) includes half frame (906*a*) and half frame (906*b*). Half frame (906*a*) shows downlink time slot (901*a*), uplink-1 time slot (902*a*), uplink-2 time slot (903*a*), uplink-3 time slot (904*a*), and syncing/scanning slot (905*a*), according to certain embodiments. Similarly, half frame (906*b*) shows downlink time slot (901*b*), uplink-1 time slot (902*b*), uplink-2 time slot (903*b*), uplink-3 time slot (904*b*), and syncing/scanning slot (905*b*). Syncing/scanning time slot occurs at the end of each half frame, whereby the smart dongle scans the communication channels used in the communication between host computer and the wireless computer peripheral devices. The smart dongle scans the communication channels for interference. If interference is detected, then the smart dongle will use a different communication channel (syncing) for downlinks and/or uplinks.

According to certain embodiments, in downlink time slot (901*a*), the smart dongle sends data from host computer to the wireless keyboard and wireless audio headset. In uplink-1 (902*a*), the wireless keyboard sends data the host computer, via the smart dongle. In uplink-2 (903*a*), the wireless mouse sends data to the host computer, via the smart dongle. In uplink-3 (904*a*), the wireless audio headset sends data to the host computer, via the smart dongle. According to certain embodiments, in downlink time slot (901*b*), the smart dongle sends data from host computer to the wireless mouse and wireless audio headset. In uplink-1 (902*b*), the wireless keyboard sends data to the host computer, via the smart dongle. In uplink-2 (903*b*), the wireless mouse sends data to the host computer, via the smart dongle. In uplink-3 (904*b*), the wireless audio headset sends data to the host computer, via the smart dongle.

For purposes of explanation, assume that in frame-2 (950), the wireless keyboard (or any other wireless computer peripheral device that was previously available for communication but is now unavailable for communication with the host computer) has become unavailable for communication with the host computer or it simply does not have data to send to the host computer for the next few milliseconds in frame-2. Frame-2 (950) includes half frame (906A) and half frame (906B). In the event that the wireless keyboard has become unavailable for communication with the host computer or does not have data to send to host computer during frame-2, the smart dongle will dynamically assign time slots to the other wireless computer peripheral devices that are available for communication with the host computer so as to make use of the time slots that would have been otherwise used by the wireless keyboard for communication. For example, as shown in half frame (906A) of frame-2 (950), according to certain embodiments, in downlink time slot (901A), the smart dongle sends data from host computer to the wireless mouse and wireless audio headset since the keyboard is no longer available for communication or does need to send data at that time. Further, the smart dongle assigns the uplink-1 (902A) slot, and uplink-2 (903A) slot to the wireless mouse so that the wireless mouse can send data to the host computer, via the smart dongle. In uplink-3 (904A), the wireless audio headset sends data to the host computer, via the smart dongle. Similarly, in half frame (906B) of frame-2 (950), according to certain embodiments, in downlink time slot (901B), the smart dongle sends data from host computer to the wireless mouse and wireless audio headset since the wireless keyboard is no longer available for communication or does not need to send data at that time. The smart dongle assigns the uplink-1 (902B)

slot, and uplink-2 (903B) slot to the wireless mouse so that the wireless mouse can send data to the host computer, via the smart dongle. In uplink-3 (904B), the wireless audio headset sends data to the host computer, via the smart dongle. Syncing/scanning time slot occurs at the end of each half frame (905A, 905B) in frame-2 (950), whereby the smart dongle scans the communication channels used in the communication between host computer and the wireless computer peripheral devices. The smart dongle scans the communication channels for interference. If interference is detected, then the smart dongle will use a different communication channel for downlinks and/or uplinks. According to certain embodiments, the wireless computer peripheral device that needs extra slots to send data to the host computer can notify the smart dongle of such a need during syncing/scanning by the smart dongle. The embodiments are not restricted to 3 wireless computer peripheral devices as described above with reference to FIG. 9. The number of wireless computer peripheral devices managed by the smart dongle can vary from implementation to implementation. The number of wireless computer peripheral devices that can be paired to the smart dongle for management can be X, where X is an integer that is less than 10. As a non-limiting example and for purposes of explanation, assume that X=4. To explain, assume the number of wireless computer peripheral devices paired to the smart dongle include 2 wireless keyboards (KB-One, and KB-Two, one wireless mouse and one wireless audio headset. If, for example, one of the keyboards (KB-One) became unavailable for communication or does not need to send data at a given time, then the smart dongle can assign an extra slot to KB-Two or to the wireless mouse depending on which of these wireless computer peripheral devices needs the slot. According to certain embodiments, if both KB-Two and the wireless mouse needs the extra slot, then the smart dongle will assign the extra slot to the wireless mouse because the wireless mouse has a higher data transmission priority than the wireless keyboard. According to certain other embodiments, a user can configure the data transmission priority for each wireless computer peripheral device of the set of wireless computer peripheral devices that the user chooses to pair to the smart dongle.

FIG. 10 illustrates payloads that are dynamically assigned and created by a smart dongle, according to some embodiments of the subject application. According to some embodiments, the smart dongle has a micro controller unit. According to certain embodiments, the smart dongle communication management system uses the data structures, timing, buffer and frame format that are based on audio data structures, timing, buffer and frame format.

FIG. 10 shows time slots in frame-1 (1000) and frame-2 (1050) for data communication (digital transmission) between a host computer and wireless computer peripheral devices (wireless audio headset, wireless keyboard, wireless mouse) created by the smart dongle plugged into the host computer.

Frame-1 (1000) includes half frame (1006*a*) and half frame (1006*b*). Half frame (1006*a*) shows downlink time slot (1001*a*), uplink-1 time slot (1002*a*), uplink-2 time slot (1003*a*), uplink-3 time slot (1004*a*), and syncing/scanning slot (1005*a*), according to certain embodiments. Similarly, half frame (1006*b*) shows downlink time slot (1001*b*), uplink-1 time slot (1002*b*), uplink-2 time slot (1003*b*), uplink-3 time slot (1004*b*), and syncing/scanning slot (1005*b*). Frame-2 (1050) includes half frame (1006A) and half frame (1006B). Half frame (1006A) shows downlink time slot (1001A), uplink-1 time slot (1002A), uplink-2 time slot (1003A), uplink-3 time slot (1004A), and syncing/scanning slot (1005A), according to certain embodiments. Similarly, half frame (1006B) shows downlink time slot (1001B), uplink-1 time slot (1002B), uplink-2 time slot (1003B), uplink-3 time slot (1004B), and syncing/scanning slot (1005B). Syncing/scanning time slot occurs at the end of each half frame, whereby the smart dongle scans the communication channels used in the communication between host computer and the wireless peripheral devices. The smart dongle scans the communication channels for interference. If interference is detected, then the smart dongle will use a different communication channel (syncing) for downlinks and/or uplinks.

According to certain embodiments, in downlink time slot (1001*a*), the smart dongle sends data from host computer to the wireless keyboard and wireless audio headset. In uplink-1 (1002*a*), the wireless keyboard sends data to the host computer, via the smart dongle. In uplink-2 (1003*a*), the wireless mouse sends data to the host computer, via the smart dongle. In uplink-3 (1004*a*), the wireless audio headset sends data to the host computer, via the smart dongle. According to certain embodiments, in downlink time slot (1001*b*), the smart dongle sends data from host computer to the wireless mouse and wireless audio headset. In uplink-1 (1002*b*), the wireless keyboard sends data to the host computer, via the smart dongle. In uplink-2 (1003*b*), the wireless mouse sends data to the host computer, via the smart dongle. In uplink-3 (1004*b*), the wireless audio headset sends data to the host computer, via the smart dongle.

For purposes of explanation, assume that in frame-2 (1050), one of the wireless computer peripheral devices, e.g., wireless mouse, needs to send more data than the other wireless computer peripheral devices (e.g., wireless keyboard and wireless audio headset). According to certain embodiments, the smart dongle will dynamically assign more payload capability to the wireless mouse for communication to the host computer, in the event that the wireless mouse needs to send more data than the other wireless computer peripheral devices. According to certain embodiments, frame-2 (1050) illustrates an example of dynamic payload assignment by the smart dongle. In frame-2 (1050), in uplink-2 1003A and uplink-2 1003B, the wireless mouse is able to send more data to the host computer (shown pictorially as larger rectangles in FIG. 10) as compared with the amount of data sent by the wireless keyboard (uplink-1 1002A, uplink-1 1002B) and by wireless audio headset (uplink-3 1004A, uplink-2 1004B) to the host computer. Further, in frame-2 (1050), in downlink time slot (1001A), the smart dongle sends data from host computer to the wireless keyboard and wireless audio headset, and in downlink time slot (1001B), the smart dongle sends data from host computer to the wireless mouse and wireless audio headset.

Syncing/scanning time slot (1005A, 1005B) occurs at the end of each half frame, whereby the smart dongle scans the communication channels used in the communication between host computer and the wireless peripheral devices. The smart dongle scans the communication channels for interference. If interference is detected, then the smart dongle will use a different communication channel (syncing) for downlinks and/or uplinks. According to certain embodiments, the wireless computer peripheral device that needs extra payload capability for a given slot when sending data to the host computer can notify the smart dongle during syncing/scanning by the smart dongle. The embodiments are not restricted to 3 wireless computer peripheral devices as described above with reference to FIG. 10. The number of wireless computer peripheral devices managed by the smart dongle can vary from implementation to implementation. The number of wireless computer peripheral devices that can be paired to the smart dongle for management can be X, where X is an integer that is less than 10. As a non-limiting example and for purposes of explanation, assume that X=4. To explain, assume the number of wireless computer peripheral devices paired to the smart dongle include 2 wireless mice (M-One, and M-Two), one wireless keyboard and one wireless audio headset. If, for example, one of the wireless mice (M-One) needs to send more data at a given time, then the smart dongle can assign more payload capability to M-One. According to certain embodiments, if, as another example, the wireless keyboard and the wireless mouse M-One each needs the extra payload capability, then the smart dongle will give preference to the wireless mouse M-One over the wireless keyboard because wireless mice have a higher data transmission priority than wireless keyboards. According to certain other embodiments, a user can configure the data transmission priority for each wireless computer peripheral device of the set of wireless computer peripheral devices that the user chooses to pair to the smart dongle.

According to certain embodiments, and with reference to FIG. 8, FIG. 9 and FIG. 10, low latency is achieved by performing one or more of the following: 1) minimizing the transmit and receive slots in a digital transmission frame by reducing the payloads, 2) by optimizing the time between transmit and receive settings, 3) by scanning channels to reduce data packet loss, 4) by transmitting multiple types of data in small chunks, 5) by reconstructing the small chunks of data packets received into full data packet.

According to certain embodiments, data from a wireless audio headset is multiplexed with data from a wireless mouse and data from a wireless keyboard based on audio data structures, timing, buffer and frame format for digital transmission.

According to certain embodiments, a smart dongle is used for enabling wireless communication between a user's computer and a plurality of user's wireless computer peripheral devices, the smart dongle comprises: a memory, a micro controller, the micro controller configured to: (1) create a data frame for digital transmission based on an audio-type frame format of sample rate in a range of 44 kHz to 96 kHz; (2) create a respective time slot in the data frame for each of a wireless mouse, a wireless keyboard and a wireless audio headset of the plurality of user's wireless peripheral devices that are paired to the smart dongle; (3) transmit data from the wireless keyboard to the user's computer at a first latency that is less than a first time period in a range of 2 milliseconds to 3 milliseconds; (4) transmit data from the wireless mouse to the user's computer at a second latency that is less than a second time period in a range of 2 milliseconds to 3 milliseconds; and (5) transmit data from the wireless audio headset to the user's computer at a third latency that is less than a third time period in a range of 10 milliseconds to 14 milliseconds.

According to certain embodiments, the smart dongle's micro controller is configured to dynamically assign time slots in the data frame to the plurality of user's wireless computer peripheral devices based on corresponding communication needs of the plurality of user's wireless computer peripheral devices with respect to the user's computer.

According to certain embodiments, the smart dongle's micro controller is configured to dynamically assign size of payloads in the data frame to the plurality of user's wireless computer peripheral devices based on corresponding communication needs of the plurality of user's wireless computer peripheral devices with respect to the user's computer.

According to certain embodiments, the smart dongle's micro controller is configured to minimize transmit slots and receive slots in the data frame by reducing payloads.

According to certain embodiments, the smart dongle's micro controller is configured to optimize timing between transmit and receive settings.

According to certain embodiments, the smart dongle's micro controller is configured to scan channels to reduce data packet loss.

According to certain embodiments, the smart dongle's micro controller is configured to transmit multiple types of data in small chunks of data packets.

According to certain embodiments, the smart dongle's the micro controller is configured to reconstruct the small chunks of data packets that are received into full data packets.

While the invention has been described and illustrated with reference to specific embodiments thereof, these descriptions and illustrations do not limit the invention. It should be understood by those skilled in the art that various changes may be made and equivalents may be substituted without departing from the true spirit and scope of the invention as defined by the appended claims. The illustrations may not necessarily be drawn to scale. There may be distinctions between the artistic renditions in the subject application and the actual invention, due to manufacturing processes and tolerances. There may be other embodiments of the present invention which are not specifically illustrated. The specification and drawings are to be regarded as illustrative rather than restrictive. Modifications may be made to adapt a particular situation, material, composition of matter, method, or process to the objective, spirit and scope of the invention. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the invention. Accordingly, unless otherwise specifically indicated herein, the order and grouping of the operations are not limitations of the invention. Moreover, the effects detailed in the above-described embodiments and the like are merely examples. Therefore, the subject application may further have other effects.

We claim:

1. A smart dongle for enabling wireless communication between a user's computer and a plurality of user's wireless computer peripheral devices, the smart dongle comprising:
   a memory;
   a micro controller, the micro controller configured to:
      create a data frame for digital transmission based on an audio-type frame format of sample rate in a range of 44 kHz to 96 kHz;
      create a respective time slot in the data frame for each of a wireless mouse, a wireless keyboard and a wireless audio headset of the plurality of user's wireless peripheral devices that are paired to the smart dongle;
      transmit data from the wireless keyboard to the user's computer at a first latency that is less than a first time period in a range of 2 milliseconds to 3 milliseconds;

transmit data from the wireless mouse to the user's computer at a second latency that is less than a second time period in a range of 2 milliseconds to 3 milliseconds; and transmit data from the wireless audio headset to the user's computer at a third latency that is less than a third time period in a range of 10 milliseconds to 14 milliseconds.

2. The smart dongle of claim 1, wherein the micro controller is configured to dynamically assign time slots in the data frame to the plurality of user's wireless computer peripheral devices based on corresponding communication needs of the plurality of user's wireless computer peripheral devices with respect to the user's computer.

3. The smart dongle of claim 1, wherein the micro controller is configured to dynamically assign size of payloads in the data frame to the plurality of user's wireless computer peripheral devices based on corresponding communication needs of the plurality of user's wireless computer peripheral devices with respect to the user's computer.

4. The smart dongle of claim 1, wherein the micro controller is configured to minimize transmit slots and receive slots in the data frame by reducing payloads.

5. The smart dongle of claim 1, wherein the micro controller is configured to optimize timing between transmit and receive settings.

6. The smart dongle of claim 1, wherein the micro controller is configured to scan channels to reduce data packet loss.

7. The smart dongle of claim 1, wherein the micro controller is configured to transmit multiple types of data in small chunks of data packets.

8. The smart dongle of claim 1, wherein the micro controller is configured to reconstruct the small chunks of data packets that are received into full data packets.

* * * * *